(12) United States Patent
Chong et al.

(10) Patent No.: US 11,765,628 B2
(45) Date of Patent: Sep. 19, 2023

(54) APPARATUS AND METHOD FOR IMPROVING HANDOVER PERFORMANCE IN WIRELESS COMMUNICATION SYSTEM

(71) Applicant: SAMSUNG ELECTRONICS CO., LTD., Suwon-si (KR)

(72) Inventors: Dahae Chong, Seongnam-si (KR); Joohyun Do, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 186 days.

(21) Appl. No.: 17/226,674

(22) Filed: Apr. 9, 2021

(65) Prior Publication Data

US 2022/0014978 A1     Jan. 13, 2022

(30) Foreign Application Priority Data

Jul. 9, 2020    (KR) ........................ 10-2020-0084939

(51) Int. Cl.
| | |
|---|---|
| *H04W 36/00* | (2009.01) |
| *H04W 56/00* | (2009.01) |
| *H04W 76/27* | (2018.01) |
| *H04B 17/336* | (2015.01) |
| *H04B 17/318* | (2015.01) |
| *H04W 72/30* | (2023.01) |

(52) U.S. Cl.
CPC ...... *H04W 36/0058* (2018.08); *H04B 17/318* (2015.01); *H04B 17/336* (2015.01); *H04W 36/0061* (2013.01); *H04W 56/001* (2013.01); *H04W 72/30* (2023.01); *H04W 76/27* (2018.02)

(58) Field of Classification Search
CPC ... H04W 56/001; H04W 36/30; H04W 76/27; H04W 72/542; H04W 56/0015; H04B 17/318; H04L 5/0048; H04J 11/0073
See application file for complete search history.

(56) References Cited

U.S. PATENT DOCUMENTS

| | | |
|---|---|---|
| 2019/0014493 A1 | 1/2019 | Kim et al. |
| 2019/0052378 A1 | 2/2019 | Yiu et al. |
| 2019/0074886 A1* | 3/2019 | Yoon .................... H04B 7/0617 |

(Continued)

FOREIGN PATENT DOCUMENTS

KR    10-2020-0093197     1/2020

*Primary Examiner* — Yee F Lam
(74) *Attorney, Agent, or Firm* — F. CHAU & ASSOCIATES, LLC

(57) ABSTRACT

A baseband circuit that receives, from a RFIC, and being configured to process, a signal including a plurality of synchronization signal blocks generated in a neighbor cell and a signal including radio resource control parameters generated in a serving cell, includes: a storage; a controller configured to write/read data to/from the storage; and a signal processor controlled by the controller, wherein the controller sets a number of measurement target SSBs based on the RRC parameters, wherein the signal processor checks a validity of the set number of SSBs, and the controller stores valid SSB information in the storage based on the checking result, verifies a number of valid SSBs based on the stored valid SSB information, and controls the signal processor or invalidates the neighbor cell so that the signal processor measures reference signal received power of the neighbor cell based on a verification result.

8 Claims, 13 Drawing Sheets

(56) References Cited

U.S. PATENT DOCUMENTS

| | | | |
|---|---|---|---|
| 2019/0149383 A1* | 5/2019 | Ko | H04W 72/23 |
| | | | 370/329 |
| 2019/0150161 A1* | 5/2019 | Cheng | H04W 24/10 |
| | | | 370/330 |
| 2019/0182000 A1 | 6/2019 | Futaki | |
| 2019/0222286 A1 | 7/2019 | Miao | |
| 2019/0261206 A1* | 8/2019 | Gheorghiu | H04L 27/2646 |
| 2019/0306924 A1 | 10/2019 | Zhang et al. | |
| 2019/0327768 A1 | 10/2019 | Zhang et al. | |
| 2019/0363809 A1 | 11/2019 | Yoon et al. | |
| 2020/0014447 A1 | 1/2020 | Yiu et al. | |
| 2020/0022068 A1* | 1/2020 | Ly | H04J 11/0073 |
| 2020/0052767 A1 | 2/2020 | Wang et al. | |
| 2020/0059957 A1 | 2/2020 | Pan et al. | |
| 2020/0169340 A1 | 5/2020 | Hwang et al. | |

\* cited by examiner

FIG. 3

| SSB | SSB index | RS |
|---|---|---|
| SSB1 | 000 | RS_1 |
| SSB2 | 001 | RS_2 |
| SSB3 | 010 | RS_3 |
| SSB4 | 011 | RS_4 |
| SSB5 | 100 | RS_5 |
| SSB6 | 101 | RS_6 |
| SSB7 | 110 | RS_7 |
| SSB8 | 111 | RS_8 |

TB

APPARATUS AND METHOD FOR IMPROVING HANDOVER PERFORMANCE IN WIRELESS COMMUNICATION SYSTEM

CROSS-REFERENCE TO RELATED APPLICATION

This application is based on and claims priority under 35 U.S.C. § 119 to Korean Patent Application No. 10-2020-0084939, filed on Jul. 9, 2020, in the Korean Intellectual Property Office, the disclosure of which is incorporated by reference herein in its entirety.

TECHNICAL FIELD

This disclosure relates generally to wireless communications and more particularly to improving handover performance in a wireless communication system.

DISCUSSION OF THE RELATED ART

To meet the increasing demand for wireless data traffic since the commercialization of fourth generation (4G) communication systems, efforts have been made to develop and commercialize an improved fifth generation (5G) communication system, also known as a New Radio (NR) system.

To achieve a high data rate, the 5G communication system may be implemented with capability for millimeter (mm) wave band operations (for example, around 28 GHz or 60 GHz). To reduce a path loss of radio waves in a mmWave band and increase a propagation distance of radio waves, in the 5G communication system, beamforming, massive multiple-input and multiple-output (MIMO), full dimensional (FD) MIMO (FD-MIMO), an array antenna, analog beamforming, large scale antenna technology, or the like have been or will be applied.

In addition, to improve wireless communication system networks, in the 5G communication system, technology such as an evolved small cell, an advanced small cell, a cloud radio access network (cloud radio access network (RAN)), an ultra-dense network, device to device (D2D) communication, wireless backhaul, a moving network, cooperative communication, coordinated multi-points (CoMP), and interference cancellation have been or will be applied.

Further, with 5G, an advanced coding modulation (ACM) method, such as "hybrid frequency shift keying and quadrature amplitude modulation (FQAM)" and sliding window superposition coding (SWSC), and advanced access technology such as filter bank multi carrier (FBMC) and sparse code multiple access (SCMA), or the like have been or will be applied.

In advanced wireless communication systems, a terminal may measure reference signal received power (RSRP) of a neighbor cell, which is a cell located near a serving cell to which the terminal is communicatively connected. The RSRP measurement result may be used to determine whether handover to the neighbor cell is appropriate. The terminal may transmit the measurement result to the serving cell as a measurement report. The serving cell may then transmit the measurement report to a core network, and the core network may determine whether the handover should occur based on the measurement report transmitted from the serving cell as well similar measurement reports from neighbor cells). The core network may transmit the handover determination result to the serving cell and the relevant neighbor cell. Each of the cells may then be involved in coordinating the handover.

However, depending on the situation, when measuring RSRP of the neighbor cell, there is an issue that certain signals transmitted by the serving cell may produce a large interference. In this scenario, RSRP measurement accuracy may deteriorate, which may lead to unnecessary handover of the terminal. Such unnecessary handover may degrade the modem performance of the terminal and excessively consume network resources.

SUMMARY

Embodiments of the inventive concept provide an apparatus and method for improving handover performance and stability by reducing unnecessary handovers.

According to an aspect of the inventive concept, there is provided a baseband circuit receiving, from a radio frequency integrated circuit (RFIC), and being configured to process, a signal including a plurality of synchronization signal blocks (SSBs) generated in a neighbor cell among a plurality of cells and a signal including radio resource control (RRC) parameters generated in a serving cell among the plurality of cells, including: a storage; a controller configured to write or read data to or from the storage; and a signal processor controlled by the controller, wherein the controller sets a number of measurement target SSBs among the plurality of SSBs based on the RRC parameters, the signal processor checks a validity of the set number of SSBs, and the controller stores valid SSB information in the storage based on the checking result, checks a number of valid SSBs based on the stored valid SSB information, and controls the signal processor or invalidate the neighbor cell so that the signal processor measures reference signal received power (RSRP) of the neighbor cell based on a result of the checking.

According to another aspect of the inventive concept, there is provided a terminal receiving a plurality of synchronization signal blocks (SSBs) from a neighbor cell among a plurality of cells, the terminal including: a radio frequency integrated circuit (RFIC) receiving a radio frequency (RF) signal including a radio resource control (RRC) parameter by using an RRC signaling from a serving cell among the plurality of cells, the RFIC being configured to generate a baseband signal by performing a frequency down-conversion operation on the RF signal; and a baseband circuit receiving the baseband signal from the RFIC, the baseband circuit being configured to process the received baseband signal, wherein the baseband circuit sets a number of measurement target SSBs among the plurality of SSBs provided from the neighbor cell based on the RRC parameter, checks a validity of the set number of SSBs, stores valid SSB information based on a check result, verifies a number of valid SSBs based on the stored SSB information, and measures reference signal received power (RSRP) of the neighbor cell or invalidates the neighbor cell based on a verification result.

According to another aspect of the inventive concept, there is provided an operating method of a terminal communicating with at least one cell among a plurality of cells, the method including: receiving a radio resource control (RRC) parameter from a serving cell among the plurality of cells by using RRC signaling; receiving a plurality of synchronization signal blocks (SSBs) from a neighbor cell among the plurality of cells; setting a number of measurement target SSBs among the plurality of SSBs based on the RRC parameter; checking a validity of the set number of SSBs, and storing valid SSB information based on a checking result; and verifying a number of valid SSBs based on the stored valid SSB information, and measuring reference signal received power (RSRP) of the neighbor cell or invalidating the neighbor cell based on a verification result.

BRIEF DESCRIPTION OF THE DRAWINGS

Embodiments of the inventive concept will be more clearly understood from the following detailed description taken in conjunction with the accompanying drawings in which like reference characters refer to like elements or features, wherein:

FIG. 3 is a table for explaining a reference signal differently set for each index of the SSB;

DETAILED DESCRIPTION OF EMBODIMENTS

Figure 1:
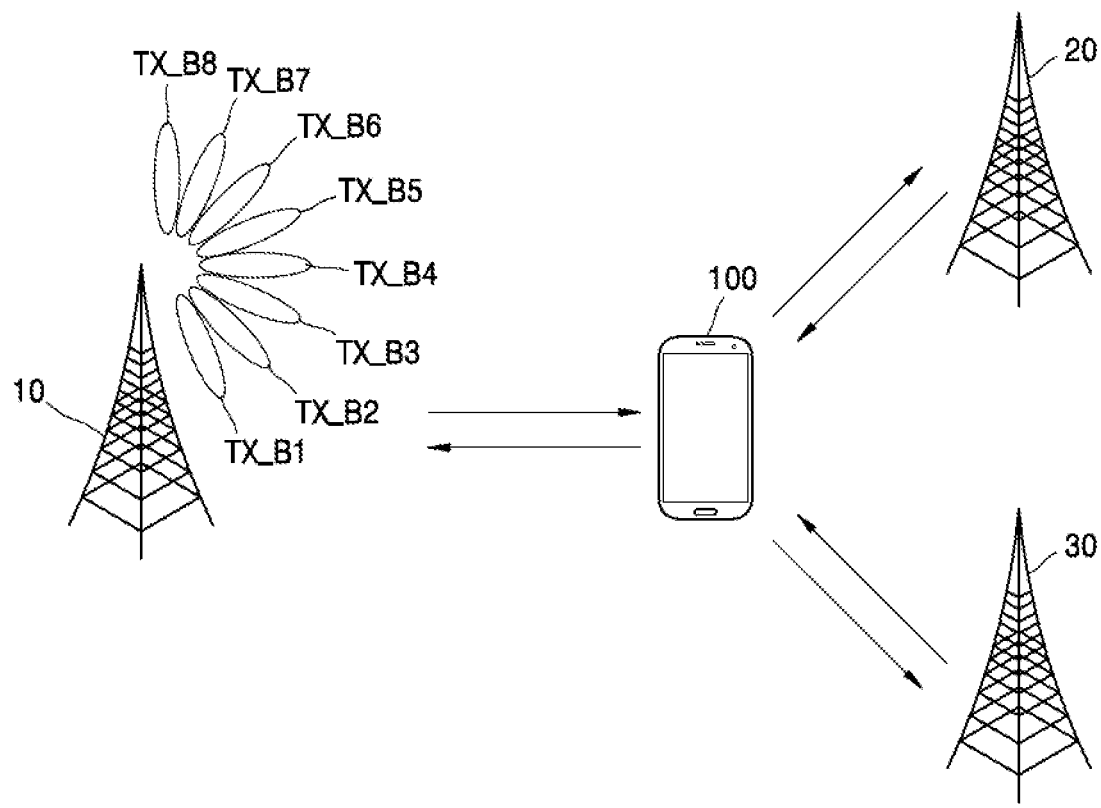
FIG. 1 is a diagram of a wireless communication system according to an embodiment of the inventive concept.

Hereinafter, embodiments of the inventive concept will be described in detail with reference to the accompanying drawings.

The terms used in the present specification are for describing example embodiments and are not intended to limit the inventive concept. In the present specification, a singular form also includes a plural form unless particularly stated in the phrase. Components, steps, operations and/or elements that are referred to by terms "comprises" and/or "comprising" used in the inventive concept do not exclude presence or addition of one or more other components, steps, operations and/or elements.

Unless otherwise defined, all terms (including technical and scientific terms) used in the present specification may be used as meanings that can be commonly understood by those of ordinary skill in the art to which the present disclosure belongs. In addition, the terms defined in a commonly used dictionary are not interpreted ideally or excessively unless defined explicitly and specifically.

In addition, in describing embodiments of the inventive concept in detail, a new radio (NR)/5G system and a long term evolution (LTE)/LTE-advanced (LTE-A) system will be mainly focused on, but the inventive concept may be applied to other communication systems having similar technical features as well as other communication systems using a licensed band and an unlicensed band.

Herein, the term "connect (couple/access)" and its derivatives refer to any direct or indirect communication between two or more components, whether or not they are in physical contact with each other. The terms "transmit", "receive", and "communicate" as well as their derivatives include both direct and indirect communications. The term "comprises" and its derivatives mean inclusion without limitation. The word "or" is an inclusive word meaning "and/or". "Related to ~" and its derivatives mean include, included in ~, interconnected with ~, contain, contained in ~, connect to ~, combine with ~, communicate with ~, cooperate with ~, intervene, put side by side, be close to ~, bounded by ~, have, have characteristics of ~, have a relationship with ~, etc. The term "controller" means any device, system, or part thereof that controls at least one operation. Such a controller may be implemented in hardware or a combination of hardware and software and/or firmware. Functions related to any particular controller may be centralized or distributed locally or remotely.

In addition, various functions described below may be implemented or supported by one or more computer programs, each of which includes computer-readable program code and is executed on a computer-readable recording medium. The terms "application" and "program" refer to one or more computer programs, software components, instruction sets, procedures, functions, objects, classes, instances, related data, or portions thereof suitable for implementation of suitable computer-readable program code. The term "computer-readable program code" includes all types of computer code including source code, object code, and executable code. The term "computer-readable recording medium" includes all types of media that can be accessed by a computer, such as read-only memory (ROM), random access memory (RAM), a hard disk drive, a compact disk (CD), a digital video disk (DVD), or some other type of memory. The term "non-transitory" computer-readable media excludes wired, wireless, optical, or other communication links that transmit transient electrical signals or other signals. The term "non-transitory computer-readable media" includes media on which data can be permanently stored, and media on which data can be stored and later overwritten, such as a rewritable optical disk or erasable memory device.

Figure 2:
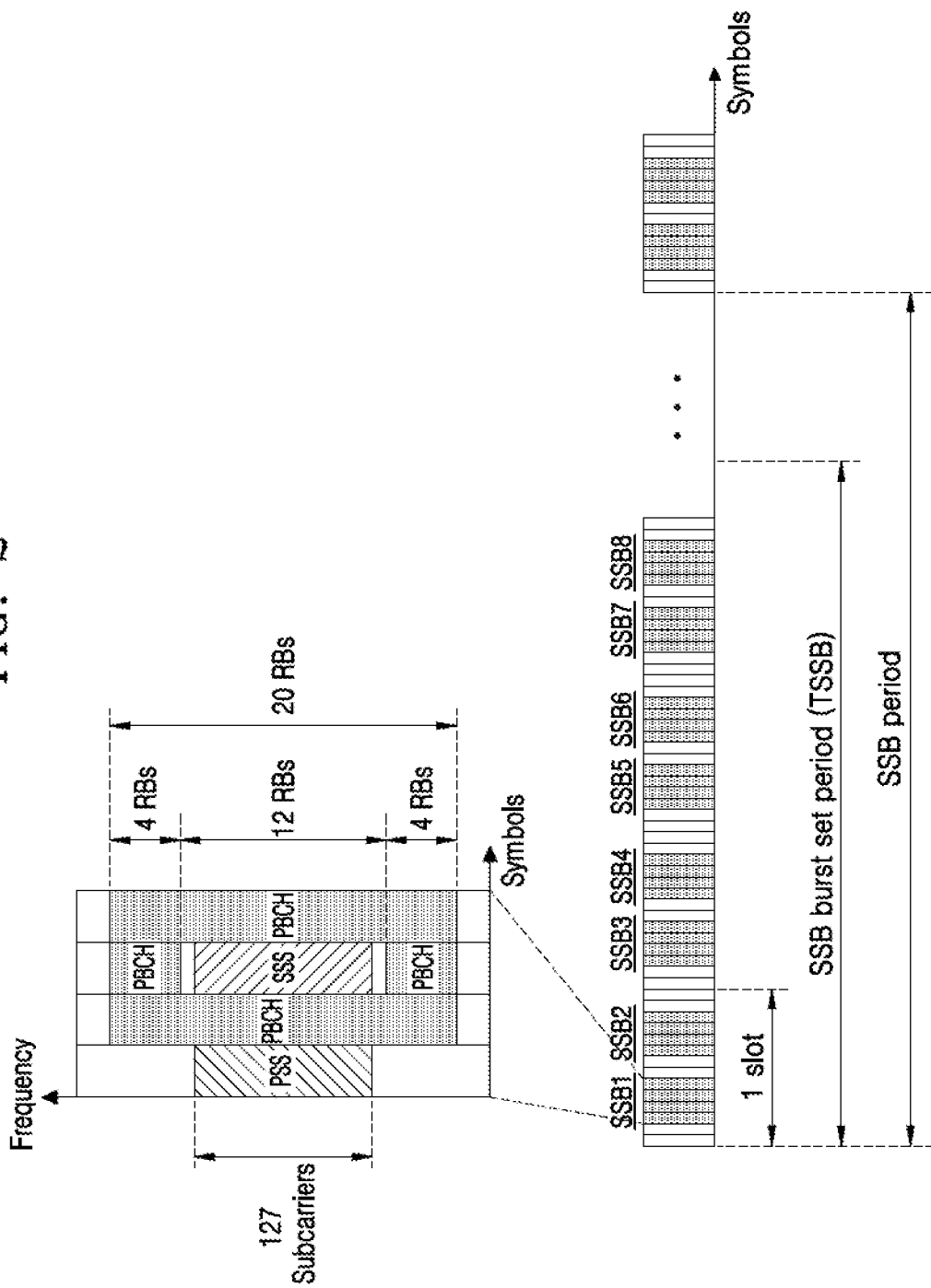
FIG. 2 is a diagram for explaining synchronization signal block (SSB) to be used for cell search.
Figure 4:
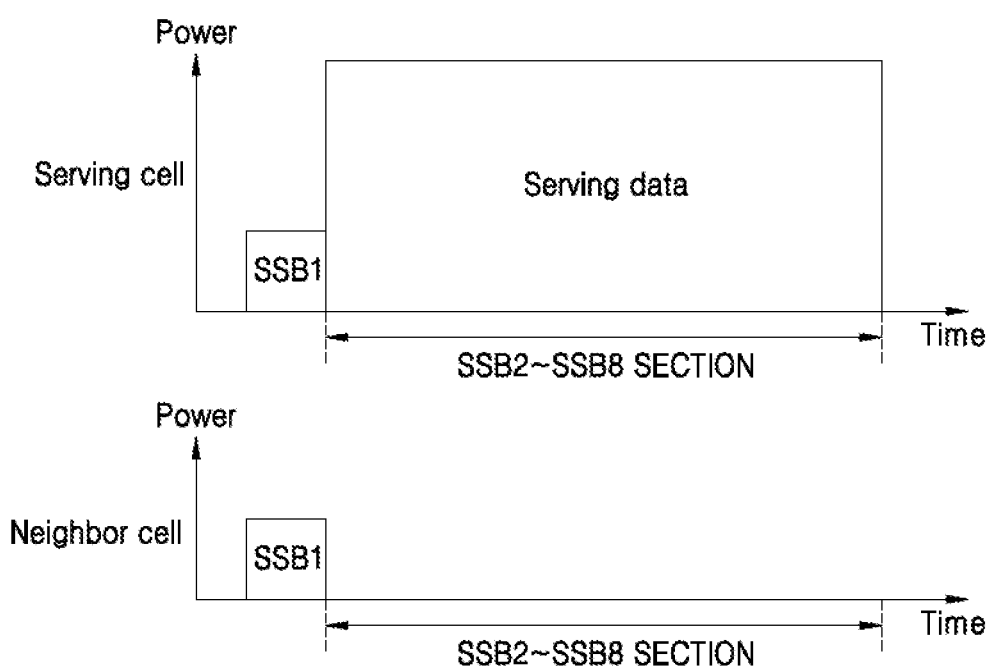
FIG. 4 is a diagram illustrating a situation that may occur when measuring reference signal received power (RSRP) of a neighbor cell.

FIG. 1 is a diagram of a wireless communication system 1 according to an embodiment of the inventive concept. FIG. 2 is a diagram for explaining a synchronization signal block (SSB) used for cell search. FIG. 3 is a table for explaining a reference signal differently set for each index of the SSB. FIG. 4 is a diagram of a situation that may occur when measuring reference signal received power (RSRP) of a neighbor cell.

First, referring to FIG. 1, the wireless communication system 1 may include a plurality of cells such as first, second and third cells 10, 20 and 30 and a terminal 100. In the examples below, a "serving cell" refers to a cell actively communicating with the terminal 100, and a "neighboring cell" refers to a cell that is a candidate to become a next serving cell through a handoff of the communication from the current serving cell. The terms "base station" and "cell" may be used interchangeably.

The terminal 100 may be connected to a network of the wireless communication system 1 by "transceiving" (transmitting and receiving) signals to and from the serving cell. The wireless communication system 1 may be referred to as a system using radio access technology (RAT), and may be, for example, a wireless communication system using a cellular network such as a fifth-generation (5G) communication system, an LTE communication system, an LTE-A communication system, a code division multiple access (CDMA) communication system, and a global system for mobile communications (GSM) communication system, a wireless local area network (LAN) (WLAN) communication system, or other suitable wireless communication system. Hereinafter, embodiments will be described in the context of a 5G communication system as an example, but the inventive concept is not limited to any particular wireless communication standard.

A wireless communication network used in the wireless communication system 1 may support communication of a plurality of wireless communication devices including the terminal 100 by sharing available network resources.

For example, in the wireless communication network, information may be transmitted in various multiple connection methods such as CDMA, frequency division multiple access (FDMA), time division multiple access (TDMA), orthogonal frequency division multiple (OFDM) access (OFDMA), single carrier frequency division multiple access (SC-FDMA), OFDM-FDMA, OFDM-TDMA, and OFDM-CDMA.

The first through third cells 10 through 30 may generally be referred to as fixed stations in communication with the terminal 100 and/or other cells, and may exchange data and control information by communicating with the terminal 100 and the other cells.

For example, the first through third cells 10 through 30 may be interpreted as a comprehensive meaning indicating an area or function covered by a base station, a Node B, an evolved-Node B (eNB), a next generation Node B (gNB), a sector, a site, and a base station controller (BSC), a base transceiver system (BTS), an access point (AP), a relay node, a remote radio head (RRH), a radio unit (RU), or the like.

In addition, in the embodiment of the inventive concept, the cell may include all various coverage areas such as a macro cell, a micro cell, a pico cell, a femto cell, and a small cell.

The terminal 100 may be stationary or mobile as a user device, and may be referred to as any device capable of communicating with the first through third cells 10 through 30 to transceive data and control information to and from the first, second, and third cells 10, 20, and 30.

For example, the terminal 100 may be referred to as a wireless device (STA), a mobile station (MS), a mobile terminal (MT), a user terminal (UT), user equipment (UE), a subscriber station (SS), a wireless device, a handheld device, etc.

The first through third cells 10 through 30 may be connected to the terminal 100 via a wireless channel, and various communication services may be provided to the terminal 100 via the connected wireless channel. In addition, all user traffic of the first through third cells 10 through 30 may be serviced via a shared channel. In addition, the first through third cells 10 through 30 may collect state information such as a buffer state, an available transmit power state, and a channel state of the terminal 100, and may perform scheduling.

In addition, the wireless communication system 1 may support beamforming technology by using orthogonal frequency division multiplexing (OFDM). In addition, the wireless communication system 1 may support an adaptive modulation and coding (AMC) method for determining a modulation scheme and a channel coding rate based on the channel state of the terminal 100.

The wireless communication system 1 may "transceive" (transmit and receive) signals over one or more frequency bands, such as a generally wideband "sub-6 GHz" band (~1-6 GHz), a 6 GHz band (using a narrowband with frequencies of about 6 GHz) and millimeter wave bands, e.g., a "28 GHz band" and/or a "60 GHz band" (bands with spectrum including or near 28 GHz and 60 GHz, respectively). Data transmission rates are typically higher at millimeter wave frequencies, provided that a line of sight link is available.

In a millimeter wave band, signal attenuation per distance may be relatively large. Accordingly, the wireless communication system 1 may support transmission and reception based on narrow directional beam to secure a coverage. Furthermore, the wireless communication system 1 may perform a beam sweeping operation for transmission and reception based on directional beams. Note that the directional beams may be generated by using multiple antennas elements.

The beam sweeping may be a process of determining a transmission beam and a reception beam which have orientation (beam pointing) directions aligned with each other, by sequentially or randomly sweeping directional beams having a certain pattern by the terminal 100 and the serving/neighboring cells. In other words, a pattern of the transmission beam and a pattern of the reception beam, which have orientation directions aligned with each other, may be determined as a pair of the transmission/reception beam patterns. Here, "beam pattern" refers to a shape of a beam that is determined based on a width and an orientation direction thereof.

In the examples to follow, to facilitate understanding of the inventive concept, the first cell 10 is assumed to be a serving cell, and the second cell 20 and third cell 30 are assumed to be neighboring cells to which a communication between the terminal 100 and the first cell 10 may be handed off. The first through third cells 10 through 30 may transmit to the terminal 100 synchronization signals each including an SSB to be used for the cell search via a plurality of transmission beams having different beam patterns from each other. As an example, the first cell 10 may transmit to the terminal 100 synchronization signals each including an SSB to be used for the cell search via first through eighth transmission beams TX_B1 through TX_B8.

Referring to FIGS. 1 and 2, the first cell 10 may transmit to the terminal 100 synchronization signals including any one of first through eighth SSBs SSB1 through SSB8 via the first through eighth transmission beams TX_B1 through TX_B8, respectively.

For example, the first cell 10 may transmit a signal including the first SSB SSB1 to the terminal 100 via the first transmission beam TX_B1, and a signal including the second SSB SSB2 to the terminal 100 via the second transmission beam TX_B2. In this manner, the first cell 10 may transmit the first through eighth SSBs SSB1 through SSB8 to the terminal 100 via the first through eighth transmission beams TX_B1 through TX_B8, respectively. In addition, the terminal 100 may search for the first cell 10 by using at least one of the received first through eighth SSBs SSB1 through SSB8.

The SSB may include a primary synchronization signal (PSS), a secondary synchronization signal (SSS), and a physical broadcast channel (PBCH).

The SSB may include four symbols, and each of the PSS, the SSS, and the PBCH may be at a position corresponding to a certain resource block (RB) in a frequency axis direction. In addition, one RB may include twelve consecutive subcarriers. In addition, the PSS corresponding to a first symbol may be transmitted to the terminal 100 via, for example, 127 subcarriers.

Two SSBs may be successively transmitted in one "slot". In addition, the first cell 10 may transmit an SSB burst set to the terminal 100 within a certain SSB period. In this case, a period for transmitting the SSB burst set may be referred to as an SSB burst set period (TSSB).

For instance, assuming that the wireless communication system 1 is the NR to which a subcarrier spacing of about 15 kHz is applied, the first cell 10 may transmit to the terminal 100 the SSB burst set including eight SSBs (the first through eighth SSBs SSB1 through SSB8) during the SSB period. In this case, a length of one slot may be about 1 ms, and the SSB period may be about 20 ms.

Thus, the number of SSBs included in the SSB burst set, the SSB period, and a length of one slot may vary depending on the subcarrier spacing, the synchronization signal period set in the cell, an allocated time interval for cell search, etc. Moreover, the subcarrier spacing may differ depending on the frequency band used and an operator.

In the same manner as the first cell 10, the second cell 20 and the third cell 30 may transmit to the terminal 100 synchronization signals including the SSBs (that is, the SSBs that may be used by the terminal 100 to search for the second cell 20 and the third cell 30) via a plurality of transmission beams.

The SSBs (the first through eighth SSBs SSB1 through SSB8) may have indices indicating the first through eighth transmission beams TX_B1 through TX_B8, respectively.

In other words, the first through eighth SSBs SSB1 through SSB8 may have different respective indices, and accordingly, the first through eighth SSBs SSB1 through SSB8 may include different respective reference signals.

For instance, the index may include certain data, and index-related information may be included in the PBCH of the SSB. The reference signal may also be included in the PBCH of the SSB, and may be, for example, a demodulation reference signal (DMRS).

Referring to FIG. 3, a first SSB SSB1 may be transmitted via the first transmission beam TX_B1, and may have an index of '000', and a reference signal RS included in the PBCH of the first SSB SSB1 may be a first reference signal RS_1. The second SSB SSB2 may be transmitted via the second transmission beam TX_B2, and may have an index of '001', and the reference signal included in the PBCH of the second SSB SSB2 may be a second reference signal RS_2. Further, as illustrated in FIG. 3, the third through eighth SSBs SSB3 through SSB8 may be transmitted via the third through eighth transmission beams TX_B3 through TX_B8, and may have indices of '010' through '111', respectively. The reference signals RS included in the PBCHs of the third through eighth SSBs SSB3 through SSB8 may be third through eighth reference signals RS_3 through RS_8, respectively.

Referring again to FIGS. 1 and 2, the terminal 100 may receive a signal including the first SSB SSB1 via the first transmission beam TX_B1 selected by the beam sweeping operation, and may perform the cell search by using the first SSB SSB1.

The terminal 100 may detect the PSS of the first SSB SSB1 in the time domain. In addition, the terminal 100 may identify, from the detected PSS, a certain timing information (for example, about a 20 ms timing) of the first cell 10, a location of the SSS of the first SSB SSB1, and a cell identification (ID) in a cell ID group of the first cell 10.

The terminal 100 may detect the SSS in the frequency domain. The terminal 100 may identify a frame timing of the first cell 10 and the ID of the cell group to which the first cell 10 belongs, from the detected SSS.

In this manner, the terminal 100 may detect the cell ID by using the received SSB, and measure the RSRP of the corresponding cell (for example, the RSRP of the DMRS of the SSS or the RSRP of the DMRS of the PBCH) for each detected cell ID. In addition, the terminal 100 may transmit information about the measured RSRP of the cell to the serving cell via the measurement report. The serving cell may transmit the transmitted measurement report to a core network (not illustrated), and the core network may determine a handover based on the measurement report transmitted from the serving cell for each of the cells (including the serving cell and neighbor cells). In addition, the core network may transmit the determination result to each of the cells (including the serving cell and neighbor cells), and each of the cells may determine whether to participate in the handover (as determined by the core network) with respect to the terminal based on the received handover result. (If the handover is mandatory according to the core network, the designated cell may just follow the handover protocol.)

For example, in an NR (5G) communication system, a plurality of SSBs may be used for beamforming, and an SSB-based RSRP may be used as a handover determining factor of a cell. Accordingly, depending on a setting of the RRC parameter that is provided via radio resource control (RRC) signaling from the serving cell to the terminal 100, an average value of the RSRPs for each SSB (for example, an average value of RSRPs equal to or greater than a certain value) or a maximum RSRP among the RSRPs of each SSB may be used as the RSRP of the corresponding cell.

In this case, the RRC parameter may include 'ssb-ToMeasure' of section 6.3.2 of the 3GPP standard TS 38.331 disclosed in <Table 1> below. The terminal 100 may measure the RSRP of the SSB for each cell by referring to the configuration of the 'ssb-ToMeasure'. When the 'ssb-ToMeasure' is not set, the terminal 100 may measure the RSRPs of all SSBs.

TABLE 1

<ssb-ToMeasure>
The set of SS blocks to be measured within the SMTC measurement duration. The first/leftmost bit corresponds to SS/PBCH block index 0, the second bit corresponds to SS/PBCH block index 1, and so on. Value 0 in the bitmap indicates that the corresponding SS/PBCH block is not to be measured while value 1 indicates that the corresponding SS/PBCH block is to be measured (e.g., as prescribed in TS 38.215 [9]). When the field is not configured the UE measures on all SS blocks. Regardless of the value of this field, SS/PBCH blocks outside of the applicable smtc are not to be measured (e.g., as in TS 38.215 [9] clause 5.1.1.).

Next, the RRC parameter may indicate an SSB-based RSRP measurement method according to section 5.5.3.3 of the 3GPP standard TS 38.331 set forth in <Table 2> below. Accordingly, the terminal 100 may use the average value or the maximum RSRP of the RSRPs equal to or greater than a certain value among the RSRPs measured according to the RRC parameter setting, as the RSRP of the corresponding cell.

TABLE 2

The UE shall:
    1> for each cell measurement quantity to be derived based on SS/PBCH block:
        2> if nrofSS-BlocksToAverage in the associated measObject is not configured; or
        2> if absThreshSS-BlocksConsolidation in the associated measObject is not configured; or
        2> if the highest beam measurement quantity value is below or equal to absThreshSS-BlocksConsolidation:
            3> derive each cell measurement quantity based on SS/PBCH block as the highest beam measurement
            quantity value, where each beam measurement quantity is described in TS 38.215 [9];
        2> else:
            3> derive each cell measurement quantity based on SS/PBCH block as the linear power scale average of the highest beam measurement quantity values above absThreshSS-BlocksConsolidation where the total number of averaged beams shall not exceed nrofSS-BlocksToAverage;
        2> apply layer 3 cell filtering as described in 5.5.3.2;

Further, the RRC parameter provided by the serving cell to the terminal 100 may include 'ssb-PositionsInBurst' of section 6.3.2 of the 3GPP standard TS 38.331 summarized in <Table 3> below. In addition, the 'ssb-PositionsInBurst' may include valid SSB bitmap information of the serving cell. Accordingly, when the valid SSB bitmap information of the 'ssb-PositionsInBurst' is different from the 'ssb-ToMeasure', the terminal 100 may measure the RSRP of the serving cell by referring to the valid SSB bitmap information of the 'ssb-PositionsInBurst'.

TABLE 3

<ssb-PositionsInBurst>
Indicates the time domain positions of the transmitted SS-blocks in a half frame with SS/PBCH blocks as defined in TS 38.213 [13], clause 4.1. The first/leftmost bit corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding SS/PBCH block is transmitted. The network configures the same pattern in this field as in the corresponding field in ServingCellConfigCommonSIB.

In this manner, the valid SSB bitmap information transmitted from the cell may be identified by using the 'ssb-PositionsInBurst'. Confirmation of the corresponding information may be possible only when the cell is the serving cell, and may not be possible when the cell is the neighbor cell.

Accordingly, when measuring the RSRP of the neighbor cell, the terminal 100 may need to self-check which SSB among the SSBs of the neighbor cell is a valid SSB.

In particular, as illustrated in FIG. 4, in a situation where both the serving cell and the neighbor cell transmit only the first SSB SSB1 to the terminal 100, and only the serving cell transmits data to the terminal 100 in an SSB2~SSB8 section (a section otherwise used for transmitting SSB2~SSB8 blocks), the accuracy of the RSRP measurement of the neighbor cell may be diminished. As an example, a situation illustrated in FIG. 4 will be described assuming a scenario in which frequency domains between the serving cell and the neighbor cell overlap each other (an intra-frequency handover case).

When "serving data" (data from the serving cell other than SSB signals in the SSB2~SSB8 section) is "beamformed" (i.e., transmitted by an antenna beam formed from multiple antennas or antenna elements) from the serving cell and transmitted to the terminal 100 with a power greater than that of the SSB, the serving data may act as a high interference when measuring the RSRP of the neighbor cell. In other words, because in the neighbor cell, the RSRP is measured assuming that there are all SSBs (that is, the first through eighth SSBs SSB1 through SSB8), even though there is actually no SSB in the SSB2~SSB8 section, the RSRP in the SSB2~SSB8 section may be measured to be high due to an interference phenomenon caused by the serving cell (that is, the interference phenomenon caused by the serving data) having relatively high power.

In this case, the measurement accuracy of the RSRP of the neighbor cell may deteriorate, and the terminal 100 may perform unnecessary handover to the neighbor cell because it believes the neighbor cell's SSB blocks transmitted during the SSB2~SSB8 section have been received with high signal strength. In addition, due to the unnecessary handover, the modem performance of the terminal 100 may suffer.

However, in embodiments of the inventive concept, to solve the above-described issue, when the RSRP of a cell is measured, the validity of SSBs provided from the corresponding cell may first be checked. In other words, a validity checking operation of the SSBs may be performed ahead of the RSRP measurement of the cell, resulting in accuracy improvement for the RSRP measurement of the cell. Furthermore, handover stability may be improved by improving the RSRP measurement accuracy of the cell, and the modem performance of the terminal 100 may be improved because of the improvement of the handover stability.

As described above, in embodiments of the inventive concept, the RSRP measurement accuracy of a cell is improved by using the above-described characteristics. Hereinafter, referring to FIG. 5, configurations of the RF transceiver of the terminal or the cell in the wireless communication system 1 will be described.

Figure 5:
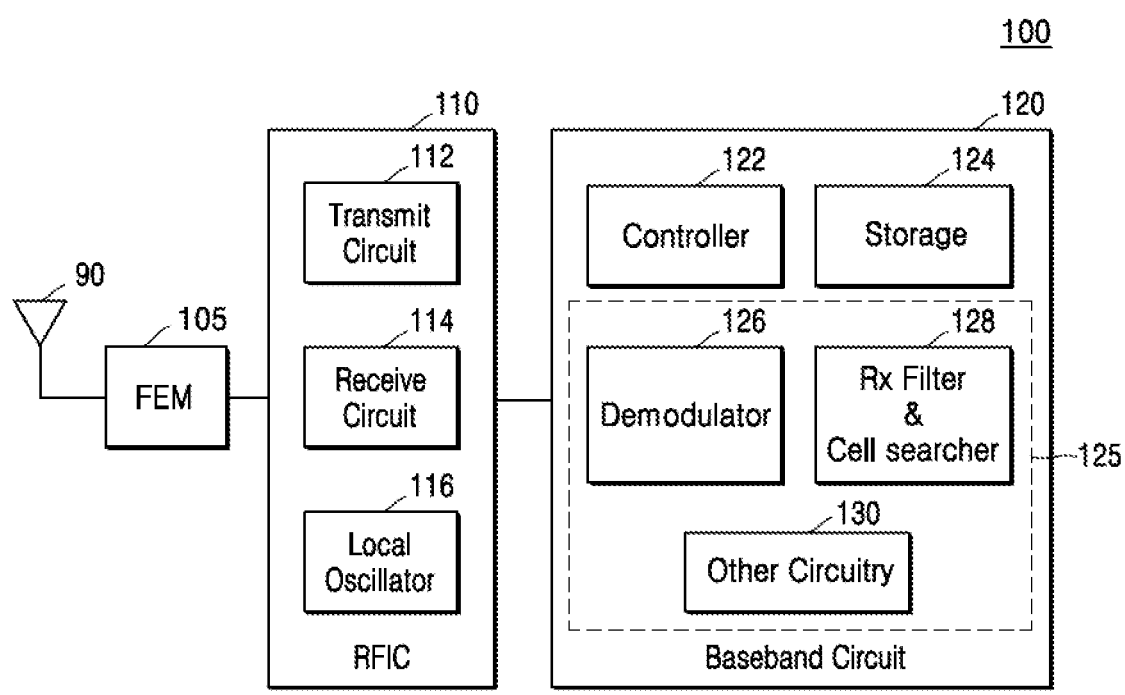
FIG. 5 is a block diagram of example radio frequency (RF) transceiver components included in the terminal or cell in FIG. 1.

FIG. 5 is a block diagram of example RF transceiver components included in the terminal 100 or the cells in FIG. 1. The components of the RF transceiver in FIG. 5 may be included in the terminal 100 or the first through third cells 10 through 30 in FIG. 1. In addition, the components of the RF transceiver in FIG. 5 may include both components in a transmitting path and components in a receiving path.

The following description of RF transceiver components illustrated in FIG. 5 included within the terminal 100 in FIG. 1 may be applied by analogy to an embodiment of a cell with similar RF transceiver components. In addition, a baseband circuit 120 in FIG. 5 will be described mainly in the context of components in the receiving path.

Referring to FIG. 5, the terminal 100 may include an antenna 90, a front-end module (FEM) 105, a radio frequency integrated circuit (RFIC) 110, and a baseband circuit 120.

The antenna 90 may be connected to the FEM 105, and may transmit a signal received from the FEM 105 to another wireless communication device (a terminal or a cell), or may provide the FEM 105 with a signal received from another wireless communication device. The FEM 105 may be connected to the antenna 90, and separate a transmission frequency from a reception frequency. In other words, the FEM 105 may separate the signals provided from the RFIC 110 for each frequency band, and provide the separated signals to the antenna 90 (or alternatively to different respective antennas or antenna elements). In addition, the FEM 105 may provide a signal received from the antenna 90 to the RFIC 110.

In this manner, the antenna 90 may transmit the frequency-separated signal by the FEM 105 to free space, or provide a signal received from free space to the FEM 105.

The antenna 90 may typically include an array antenna, which may be suitably driven for beam steering. In other cases, the antenna 90 is a single antenna or a plurality of independent antennas (not part of an array). Accordingly, in some embodiments, the terminal 100 may support a phased array, multiple-input and multiple-output (MIMO), or the like by using the plurality of antennas. However, in FIG. 5, for convenience of description, only one antenna is illustrated.

In addition, the FEM 105 may include an antenna tuner (not illustrated). Such an antenna tuner may be connected to the antenna 90, and adjust impedance of the connected antenna 90.

The RFIC 110 may generate an RF signal by performing a frequency up-conversion on a baseband signal provided by the baseband circuit 120. In addition, the RFIC 110 may generate the baseband signal by performing a frequency down-conversion operation on the RF signal provided by the FEM 105.

The RFIC 110 may include a transmission circuit 112 for a frequency up-conversion operation, a receiving circuit 114 for a frequency down-conversion operation, and a local oscillator 116, etc.

Although not illustrated, the transmission circuit 112 may include a first analog baseband filter, a first mixer, and a power amplifier. In addition, the receiving circuit 114 may include a second analog baseband filter, a second mixer, and a low-noise amplifier. The first analog baseband filter may filter the baseband signal received from the baseband circuit 120, and provide the filtered baseband signal to the first mixer. The first mixer may perform the frequency up-conversion operation of converting a frequency of the baseband signal from the baseband to a high frequency band by using a frequency signal provided by the local oscillator 116.

By using the frequency up-conversion operation, the baseband signal may be provided as an RF signal to the power amplifier, and the power amplifier may power-amplify the RF signal and provide the power-amplified RF signal to the FEM 105.

The low-noise amplifier may amplify the RF signal provided from the FEM 105 and provide the amplified RF signal to the second mixer. The second mixer may perform the frequency down-conversion operation of converting the frequency of the RF signal from the high frequency band to the baseband by using the frequency signal provided by the local oscillator 116. By using such a frequency-down conversion operation, the RF signal may be provided as a baseband signal to a second analog baseband filter, and the second analog baseband filter may filter the baseband signal and provide the filtered baseband signal to the baseband circuit 120.

The baseband circuit 120 may receive and process a baseband signal from the RFIC 110, or may generate and provide the baseband signal to the RFIC 110. In other words, the baseband circuit 120 may include, for example, a modem.

In addition, the baseband circuit 120 may include a controller 122, a storage 124, a signal processing unit ("signal processor") 125, and "other circuitry" 130.

The controller 122 may control the overall operations of both the baseband circuit 120 and the RFIC 110. In addition, the controller 122 may write or read data in or from the storage 124. To this end, the controller 122 may include at least one processor, one microprocessor, or one microcontroller, or may be a portion of the processor. The controller 122 may include, for example, a central processing unit (CPU), a digital signal processor (DSP), or the like.

The storage 124 may store data such as a basic program, an application program, setting information, or the like for the operation of the terminal 100. For example, the storage 124 may store instructions and/or data related to the controller 122, the signal processing unit 125, or the RFIC 110. Accordingly, the storage 124 may also store SSB information that is determined as being valid.

In addition, the storage 124 may include various storage media. In other words, the storage 124 may include a volatile memory, a non-volatile memory, or a combination thereof, and may include, for example, RAM such as dynamic (D) (DRAM), phase-change (P) RAM (PRAM), magnetic (M) (MRAM), and static (S) (SRAM), a flash memory such as a NAND flash memory, a NOR flash memory, and a OneNAND flash memory.

In addition, the storage 124 may store various processor-executable instructions. In addition, such processor-executable instructions may be executed by the controller 122 to carry out some or all of its functionality described herein.

The signal processing unit 125 may be controlled by the controller 122, and may process the baseband signal provided by the RFIC 110. The signal processing unit 125 may include a demodulator 126, a receiving (Rx) filter and cell searcher 128, and the "other circuitry" 130. The signal processing unit 125 (interchangeably, "signal processor" or "signal processing circuitry") may execute program instructions read from the storage 124 to carry out some or all of its functionality described herein.

The demodulator 126 may include a channel estimator, a data deallocation unit, an interference whitener, a symbol detector, a channel state information (CSI) generator, and a mobility measurement unit, an automatic gain control unit, an automatic frequency control unit, a symbol timing recovery unit, a delay spread estimation unit, a time correlator, or the like.

The mobility measurement unit may include a unit that measures signal quality of a serving cell and/or a neighbor cell to support mobility, and may measure a received signal strength indicator (RSSI), the RSRP, a reference signal received quality (RSRQ), and a reference signal (RS)-signal-to-interference & noise ratio (SINR) (RS-SINR), etc.

For example, in a second generation (2G) communication system, a third generation (3G) communication system, a fourth generation (4G) communication system, and the 5G communication system, the demodulator 126 may include a plurality of sub-demodulators (not illustrated in FIG. 5) performing the described-above functions independently or jointly for each de-spreading signal or a signal of each frequency band.

The rx filter & cell searcher 128 may include an rx filter, a cell searcher, a fast Fourier transform (FFT) unit, a time duplex (TD)-automatic gain control (AGC) (TD-AGC) unit, a TD-automatic frequency control (AFC) (TD-AFC) unit, or the like.

In this case, the rx filter (also referred to as an rx front end) may perform operations such as sampling, interference cancellation, and amplification on the baseband signal received from the RFIC 110. In addition, because the cell searcher includes a primary synchronization signal (PSS) detector, a secondary synchronization signal (SSS) detector, or the like, it may be possible to measure the size and quality of adjacent cell signals.

The other circuitry 130 may include a symbol processor, a channel decoder, an uplink processor, or the like. In this case, the symbol processor may perform channel-de-interleaving, de-multiplexing, rate-matching, or the like so that a signal that has undergone demodulation may be decoded for each channel. In addition, the channel decoder may decode a signal that has undergone demodulation in units of code blocks.

For example, the symbol processor and the channel decoder may include a hybrid automatic repeat request (HARQ) processing unit, a turbo decoder, a cyclical redundancy check (CRC) checker, a Viterbi decoder, a turbo encoder, or the like.

The uplink processor may include a processor that generates a transmission baseband signal, and may include a signal generator, a signal allocator, an inverse fast Fourier transform (IFFT) unit, a discrete Fourier transform (DFT) unit, a transmission (tx) front end, etc. In this case, the signal generator may generate a physical uplink shared channel (PUSCH), a physical uplink control channel (PUCCH), a physical random access channel (PRACH), etc. In addition, the tx front end may perform operations such as interference cancellation and digital mixing on the transmission baseband signal.

As described above, in FIG. 5, the baseband circuit 120 is illustrated to include the controller 122, the storage 124, and the signal processing unit 125. However, in the baseband circuit 120, two or more of the controller 122, the storage 124, and the signal processing unit 125 may be integrated into one chip. Moreover, each of the baseband circuit 120 and the signal processing unit 125 may further include an additional component other than the above-described components, or may not include some of the above-described components thereof.

In some embodiments, the controller 122, the storage 124, and the signal processing unit 125 may be included in one device. In other embodiments, the controller 122, the storage 124, and the signal processing unit 125 may be included in different devices (for example, distributed architecture).

As mentioned, the components of the RF transceiver in FIG. 5 configured in this manner may be included in the terminal 100 or the first through third cells 10 through 30 in FIG. 1.

The RFIC 110 and the baseband circuit 120 may include components well known to those with skill in the art. In addition, the corresponding components may be executed in a manner well known to those with skill in the art, and may be executed by using hardware, firmware, software logic, or a combination thereof.

As described above, in embodiments of the inventive concept, the terminal 100 or the first through third cells 10 through 30 have the above-described characteristics and configurations. Hereinafter, an example of an operation method of the terminal 100 illustrated in FIG. 1 (that is, a measuring method of the RSRP of a cell) will be described in detail with reference to FIGS. 6 through 10.

Figure 6:
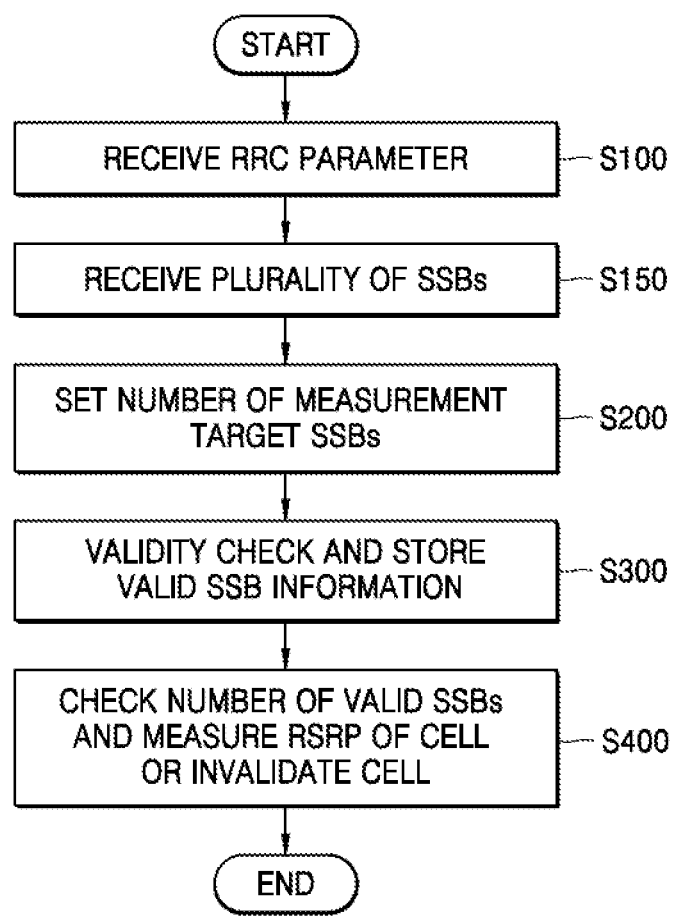
FIG. 6 is a flow chart of an operating method of the terminal illustrated in FIG. 1.
Figure 7:
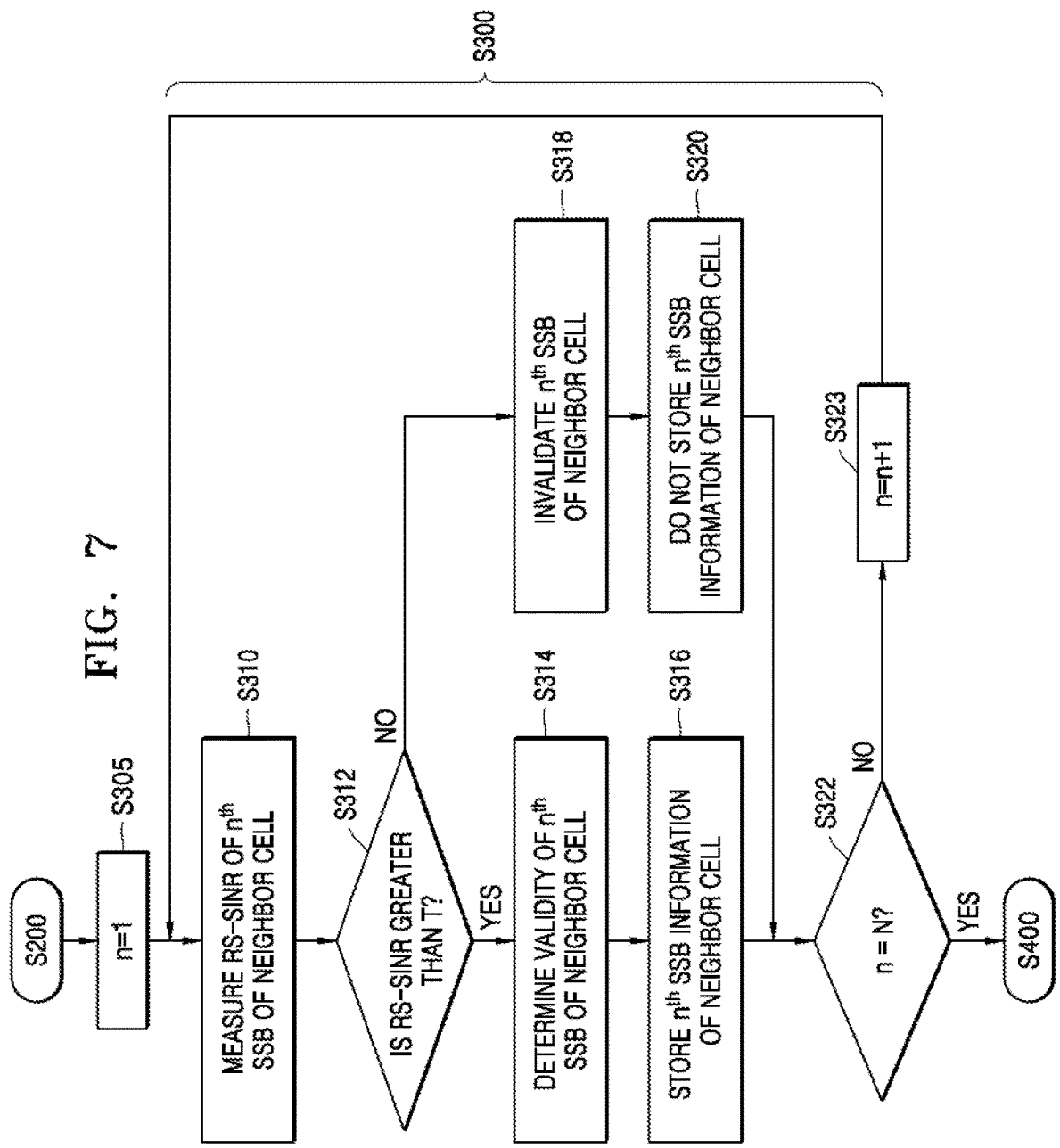
FIG. 7 is a flow chart of a first example of operation S300 in FIG. 6.
Figure 8:
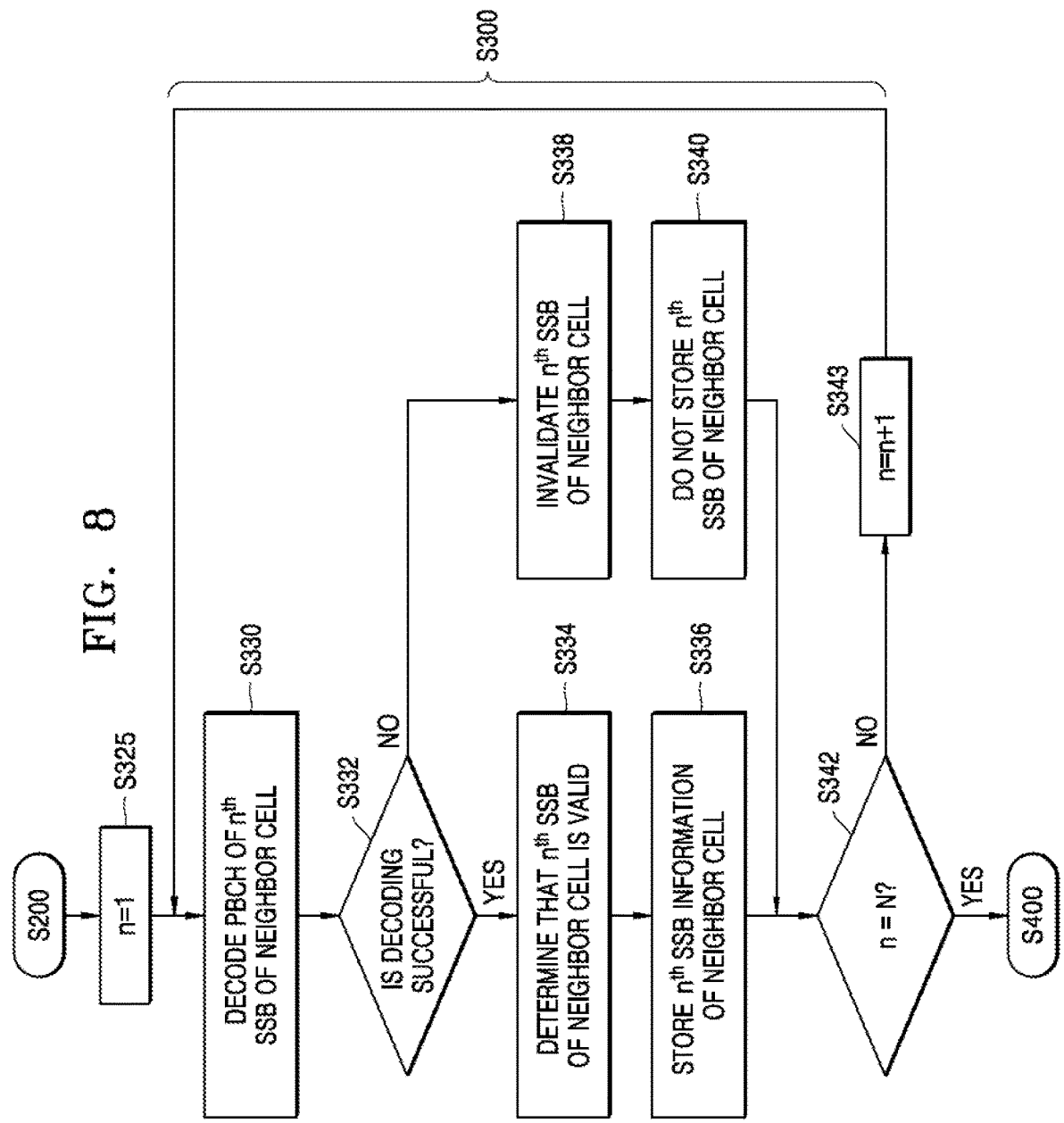
FIG. 8 is a flow chart of a second example of operation S300 in FIG. 6.
Figure 9:
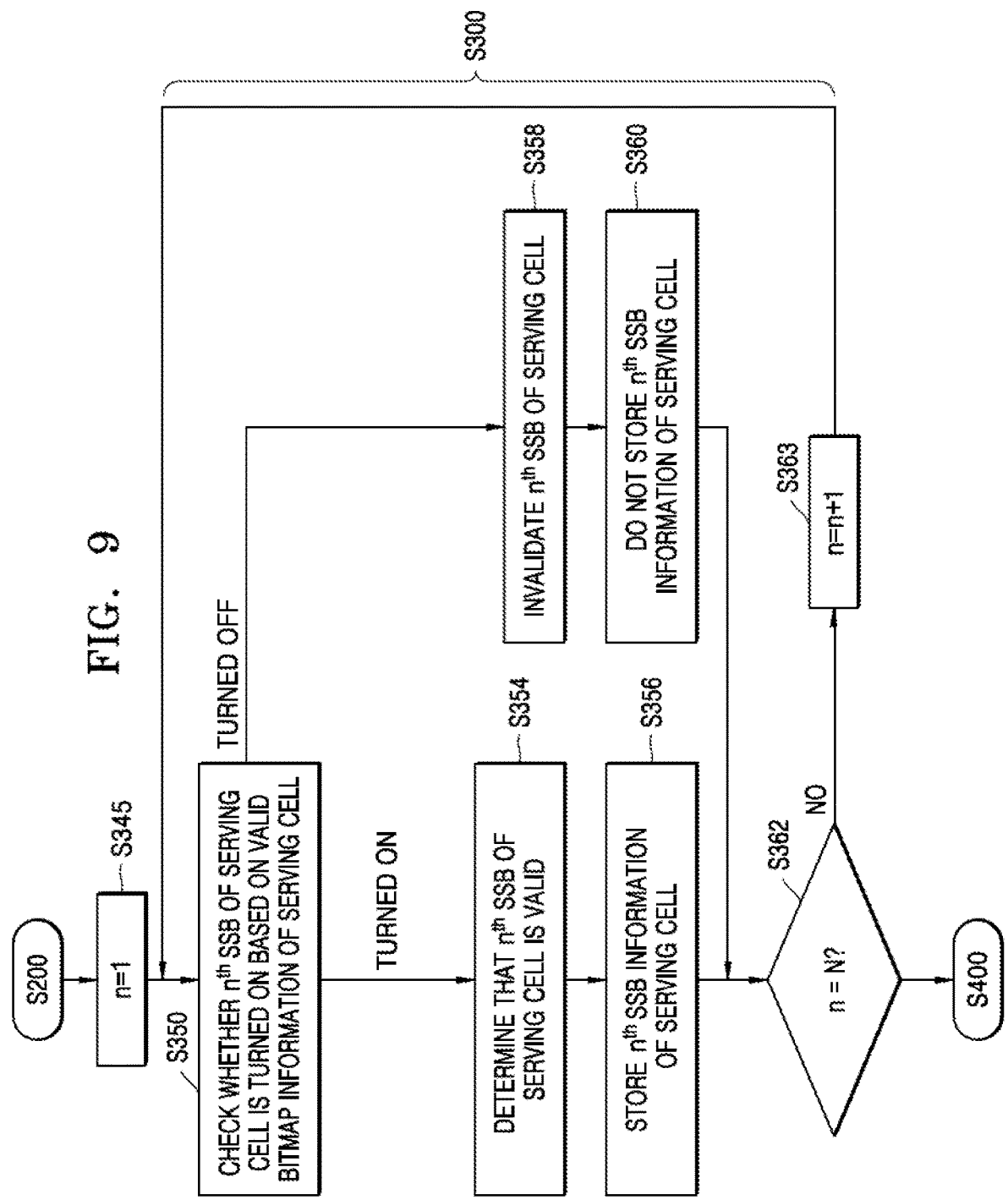
FIG. 9 is a flow chart of a third example of operation S300 in FIG. 6.
Figure 10:
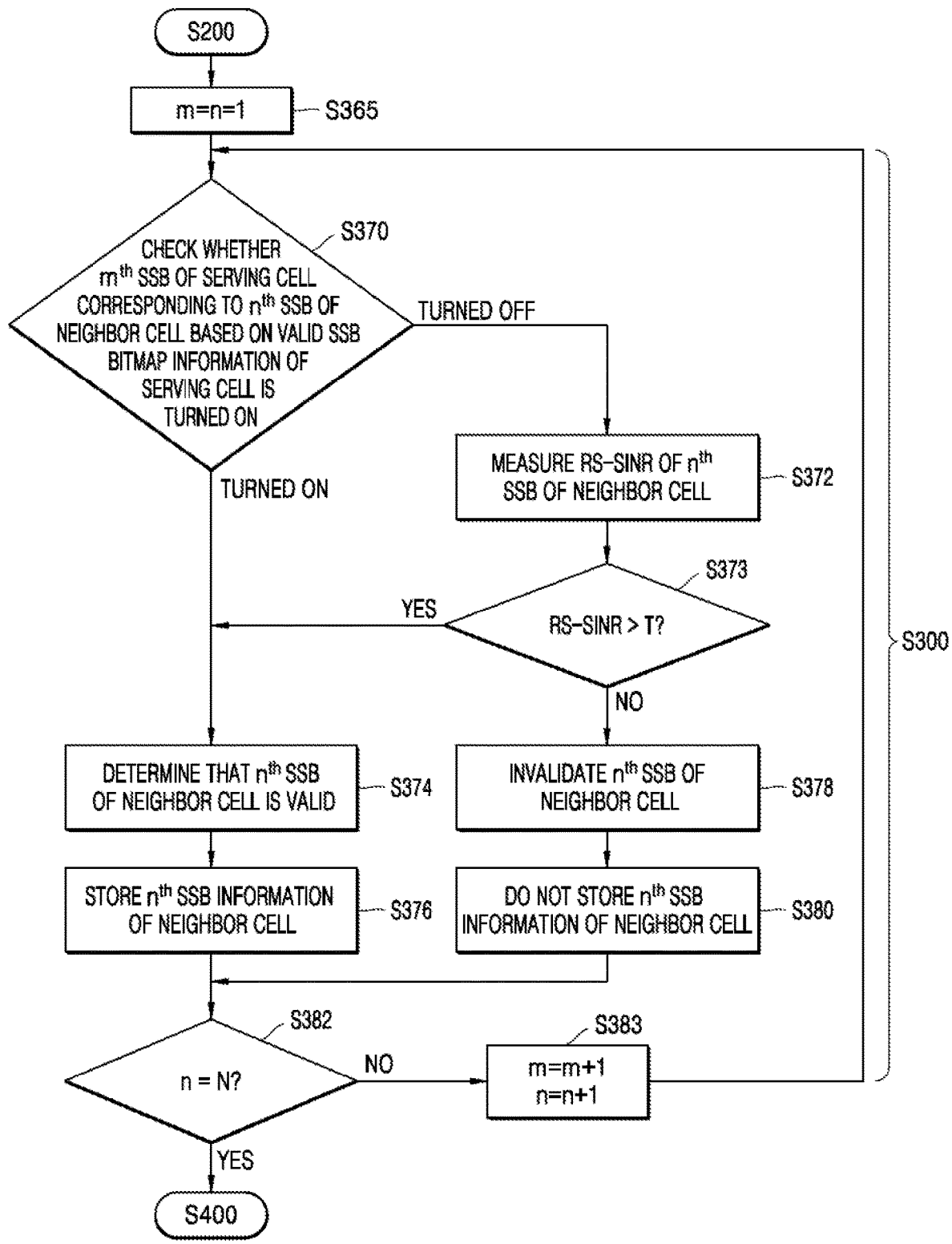
FIG. 10 is a flow chart of a fourth example of operation S300 in FIG. 6.
Figure 11:
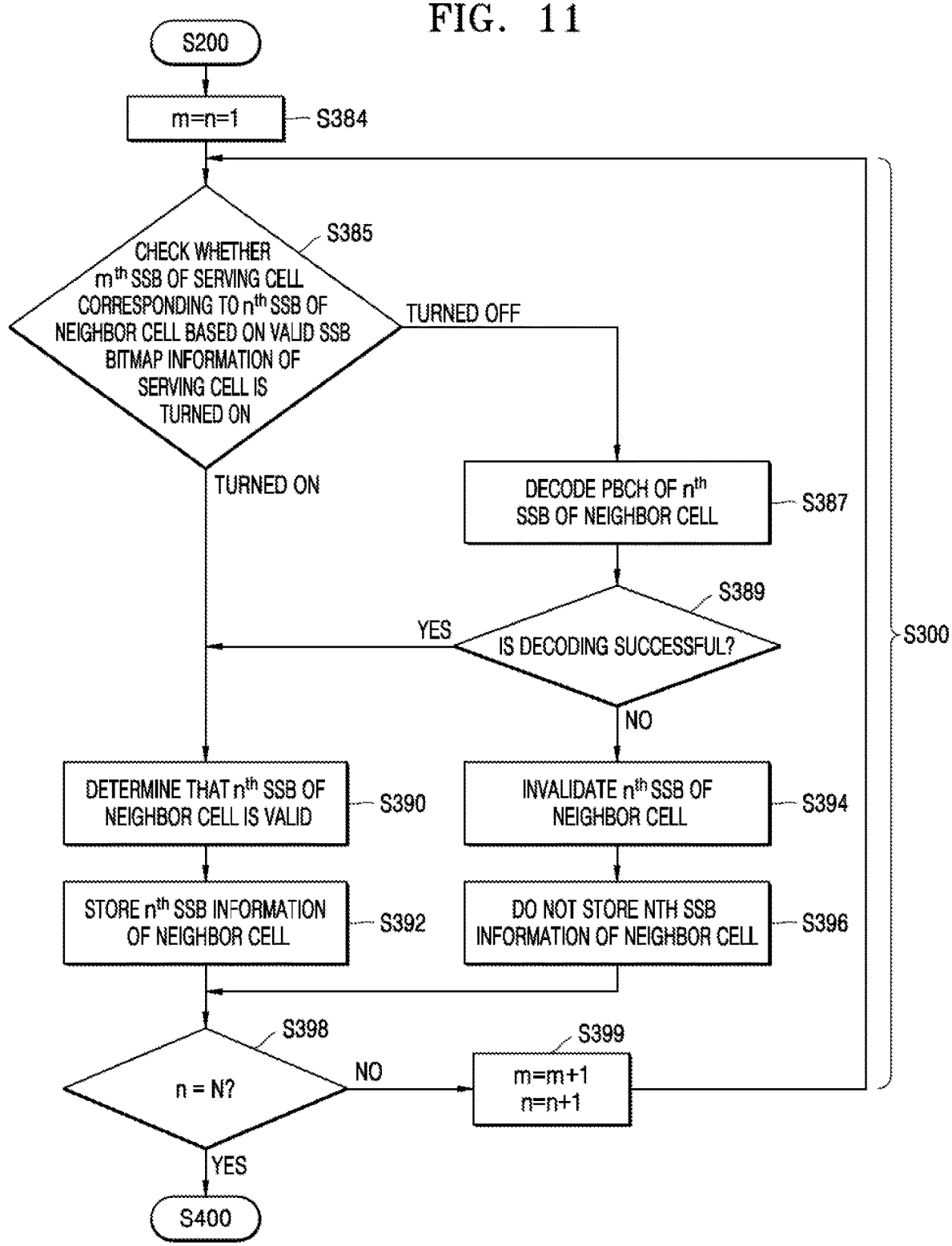
FIG. 11 is a flow chart of a fifth example of operation S300 in FIG. 6.
Figure 12:
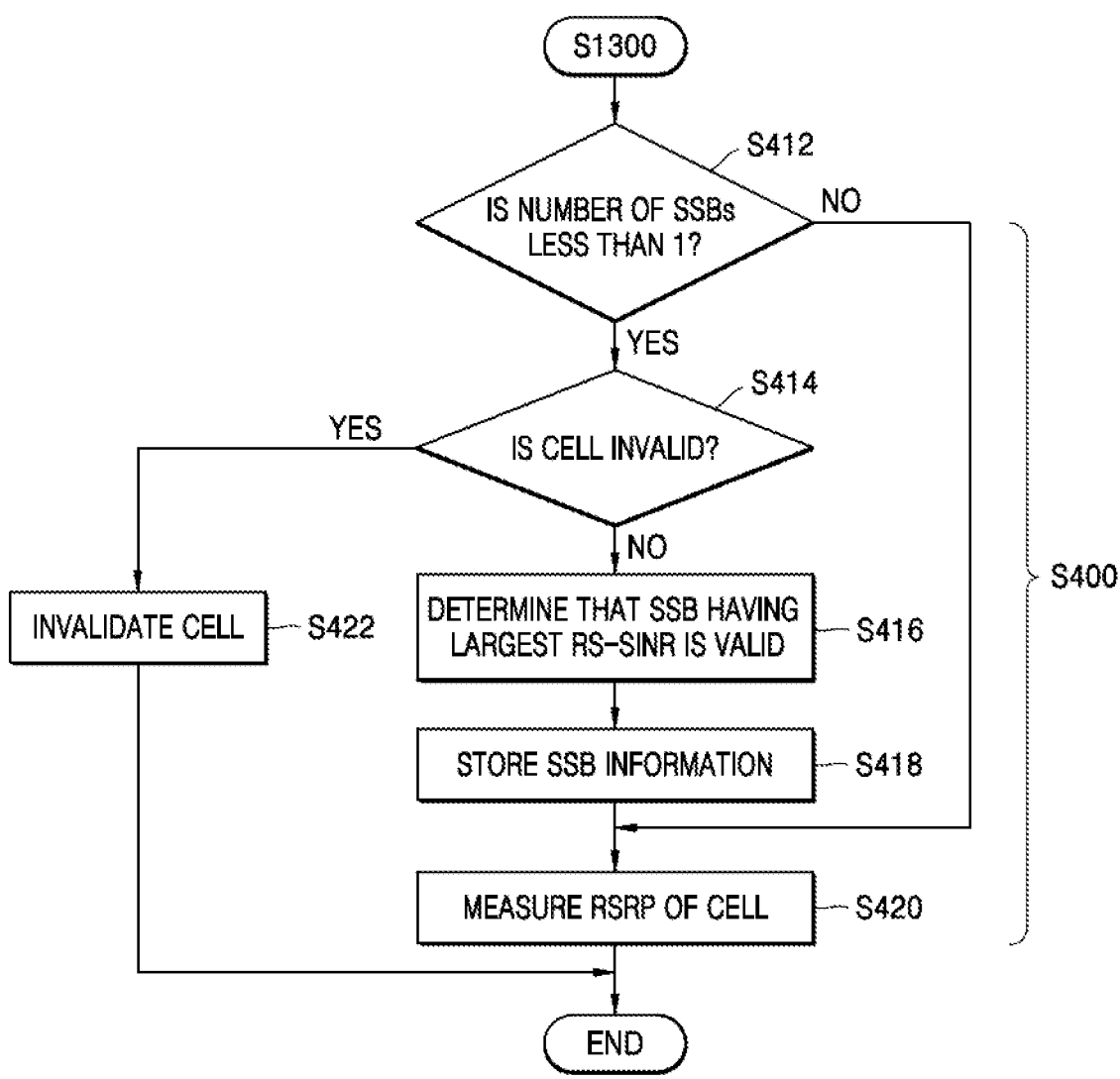
FIG. 12 is a flow chart of operation S400 in FIG. 6.

FIG. 6 is a flow chart of an operating method of the terminal 100 illustrated in FIG. 1. FIG. 7 is a flow chart of a first example of operation S300 in FIG. 6. FIG. 8 is a flow chart of a second example of operation S300 in FIG. 6. FIG. 9 is a flow chart of a third example of operation S300 in FIG. 6. FIG. 10 is a flow chart of a fourth example of operation S300 in FIG. 6. FIG. 11 is a flow chart of a fifth example of operation S300 in FIG. 6. FIG. 12 is a flow chart of operation S400 in FIG. 6.

In the following discussion, when descriptions are given with reference to FIGS. 6 through 12, FIGS. 1 through 5 will be referred to collectively.

Referring to FIG. 6, first, an "RRC parameter", which may comprise multiple parameters as discussed below, may be received (S100). (Since the RRC parameter may comprise multiple parameters, it may be referred to interchangeably hereafter as the "RRC parameters".) The RFIC 110 may receive the RF signal including the RRC parameter from the serving cell (e.g., the first cell 10) through use of RRC signaling, and may generate the baseband signal by performing the frequency down-conversion operation on the received RF signal. The baseband circuit 120 may receive the baseband signal from the RFIC 110.

The RF signal including the RRC parameter may be received by the RFIC 110 via the antenna 90 and the FEM 105 by using the RRC signaling of the serving cell. The RFIC 110 may generate the baseband signal by performing the frequency down-conversion operation on the corresponding RF signal, and the signal processing unit 125 of the baseband circuit 120 may receive the baseband signal from the RFIC 110. The signal processing unit 125 may process (demodulate, decode, or the like) the received baseband signal, and obtain the RRC parameter included in the baseband signal.

The RRC parameter may include various parameters for the RSRP measurement of the SSB. For instance, the RRC parameter may include 'ssb-ToMeasure' and 'ssb-PositionsInBurst' (described earlier) in Section 6.3.2 of the 3GPP standard TS 38.331, and may indicate the SSB-based RSRP measurement method according to Section 5.5.3.3 of the 3GPP standard TS 38.331. The signal processing unit 125 may provide the obtained RRC parameter to the controller 122.

When the RRC parameter is received (S100), a plurality of SSBs may be received (S150). In various examples, discussed below, the SSBs are received from the serving cell, a neighbor cell, or both the serving cell and a neighbor cell (among the first, second and third cells 10, 20 and 30 in the example of FIG. 1). As described above with respect to FIGS. 1 and 2, the terminal 100 may receive synchronization signals including a plurality of SSBs (for example, the first through eighth SSBs SSB1 through SSB8) via a plurality of transmission beams (for example, the first through eighth transmission beams TX_B1 through TX_B8) from a neighbor cell or cells.

The synchronization signals transmitted from the neighbor cell(s) may be received by the RFIC 110 via the antenna 90 and the FEM 105. The RFIC 110 may generate the baseband signal by performing the frequency down-conversion operation on the received synchronization signal, and the signal processing unit 125 of the baseband circuit 120 may receive the baseband signal from the RFIC 110. The signal processing unit 125 may process (demodulate, decode, or the like) the received baseband signal, and obtain a plurality of SSBs included in the baseband signal.

It is noted that operation S150 may be simultaneously performed with operation S100, or may be performed before operation S100. Below, operation S150 is described as performed after operation S100 as an example.

When a plurality of SSBs are received (S150), the number of measurement target SSBs may be set (S200). To this end, the controller 122 of the baseband circuit 120 may set the number of measurement target SSBs among the SSBs of the neighbor cell(s) based on the RRC parameters. For instance, the controller 122 may set the number of measurement target SSBs by referring to the 'ssb-ToMeasure' among the RRC parameters. One reason for setting the number of measurement target SSBs may be to determine the validity only for the number of SSBs predefined in the 'ssb-ToMeasure' among the SSBs of the neighbor cells.

When the number of measurement target SSBs is not defined in the 'ssb-ToMeasure', the number of measurement target SSBs may be set as the maximum number of SSBs to be allocated for each frequency band used for the SSBs (each "SSB frequency band").

For example, when the SSB frequency band is less than about 6 GHz, the maximum number of SSBs to be allocated (that is, the number of measurement target SSBs) may be 4 or 8. When the SSB frequency band is a millimeter wave band (e.g., a 28 GHz band or a 60 GHz band), the maximum number of SSBs to be allocated (that is, the number of measurement target SSBs) may be 64.

When the number of measurement target SSBs is set (S200), the validity of the set number of SSBs may be checked, and information about the valid SSBs may be stored based on the checked result (S300).

The signal processing unit 125 may check the validity of the set number of SSBs, and the controller 122 may store information about the valid SSBs in the storage 124 based on the checked result.

Referring to FIG. 7, the first example of operation S300 in FIG. 6 for checking the validity of SSB information and storing the same is illustrated in detail.

Operation S300 may start with operation S305 of initializing an SSB identification variable "n" to an initial value, e.g., "1" or other initial number less than or equal to a set number N of SSBs for the neighbor cell. As discussed above, the set number N of SSBs may be the number of measurement target SSBs indicated by the RRC parameter transmitted by the serving cell. In operation S310, a reference signal-signal to interference plus noise ratio (RS-SINR) of the $n^{th}$ SSB may be measured.

The signal processor 125 may measure the RS-SINR of the $n^{th}$ SSB among the set number N of SSBs. The measurement operation of the signal processing unit 125 may be controlled by the controller 122, and the RS-SINR measurement operation may be performed by the demodulator 126 of the signal processing unit 125. In other words, the RS-SINR measurement operation of the demodulator 126 may be controlled by the controller 122. In addition, a value of the RS-SINR of the SSB measured by the demodulator 126 may be stored in the storage 124.

When the RS-SINR of the $n^{th}$ SSB is measured (S310), the measured RS-SINR of the $n^{th}$ SSB may be compared with a preset reference value T (S312) stored in the storage 124.

The controller 122 may compare the measured RS-SINR of the $n^{th}$ SSB by the signal processing unit 125 with the preset reference value T. To this end, the controller 122 may compare the RS-SINR of the $n^{th}$ SSB directly provided from the signal processing unit 125 with the preset reference value T, or may read the RS-SINR of the $n^{th}$ SSB stored in the storage 124, and compare the obtained RS-SINR of the $n^{th}$ SSB with the preset reference value T.

Note that the preset reference value T may be set in advance by a user/manufacturer based on an allowable tolerance range of RSRP, and may be stored in the storage 24. Accordingly, the controller 122 may read and use the preset reference value T stored in the storage 124 during the comparison operation S312.

When the comparison operation is completed (S312), the validity of the $n^{th}$ SSB may be determined based on the comparison result (S314 or S318). To this end, when the RS-SINR of the $n^{th}$ SSB is greater than the preset reference value T, the controller 122 may determine that the $n^{th}$ SSB is valid (S314). On the other hand, when the RS-SINR of the $n^{th}$ SSB is less than or equal to the preset reference value T, the controller 122 may determine that the $n^{th}$ SSB is invalid (S318).

When the determination operation is completed (S314 or S318), a decision to store, or not store, information about the $n^{th}$ SSB based on the determination result may be made (S316 or S320).

When the $n^{th}$ SSB is determined as valid, the controller 122 may store information about the $n^{th}$ SSB in the storage 124 (S316). On the other hand, when the $n^{th}$ SSB is determined as invalid, the controller 122 may not store the information about the $n^{th}$ SSB in the storage 124 (S320). Next, operation S322 determines if n=N. If yes, the validity checking for the SSB of the neighbor cell may be completed and the flow returns to operation S400. Otherwise, n is incremented by 1 in operation S323 and the flow returns to operation S310 to repeat the just-described operations for the next higher SSB of the neighbor cell. In this manner, the first example of operation S300 in FIG. 6 may be performed as illustrated in FIG. 7.

Now, referring to FIG. 8, the second example of operation S300 in FIG. 6 is illustrated in detail. Here, operation S300 may start with operation S325 of initialing "n" to "1" or other initial number less than or equal to the set number N of SSBs, akin to operation S305 discussed above. Next, operation S330 of decoding the PBCH of the $n^{th}$ SSB may be performed.

The signal processing unit 125 may decode the PBCH of the $n^{th}$ SSB among the set number N of SSBs. Here, the decoding operation of the signal processing unit 125 may be controlled by the controller 122 and performed by the channel decoder of the signal processing unit 125.

When decoding of the PBCH of the n-th SSB is completed (S330), the controller 122 may check whether the decoding of the PBCH of the $n^{th}$ SSB is successful by receiving and analyzing the result of the decoding from the signal processor 125 (S332).

When the validity checking operation is completed (S332), the validity of the $n^{th}$ SSB may be determined based on the checking result (S334 or S338).

When the decoding operation on the PBCH of the $n^{th}$ SSB is successful, the controller 122 may determine that the $n^{th}$ SSB is valid (S334). When the decoding operation on the PBCH of the $n^{th}$ SSB is unsuccessful, the controller 122 may determine that the $n^{th}$ SSB is invalid (S338).

When the determination operation is completed (S334 or S338), a decision to store or not store information about the $n^{th}$ SSB based on the determination result may be determined (S336 or S340). When the $n^{th}$ SSB is determined to be valid, the controller 122 may store information about the $n^{th}$ SSB in the storage 124 (S336). When the $n^{th}$ SSB is determined to be invalid, the controller 122 may not store the information about the $n^{th}$ SSB in the storage 124 (S340).

Next, operation S336 determines if n=N. If yes, the validity checking for the SSB of the neighbor cell may be completed and the flow returns to operation S400. Otherwise, n may be incremented by 1 in operation S343 and the flow returns to operation S330 to repeat the just-described operations for the next SSB of the neighbor cell. In this manner, the second example of operation S300 in FIG. 6 may be performed as illustrated in FIG. 8.

Referring now to FIG. 9, the third example of operation S300 in FIG. 6 is illustrated in detail. For the case of FIG. 9, it may be assumed that the terminal 100 is provided with a plurality of SSBs from a serving cell, rather than a neighbor cell, in operation S150 in FIG. 6, and a number N of measurement target SSBs is set among the SSBs of the serving cell in operation S200 in FIG. 6.

Operation S300 of FIG. 9 may start with operation S345 of initializing an SSB identification variable "n" to an initial value, e.g., "1" or other initial number less than or equal to the set number N of SSBs for the serving cell. Next, operation S350 may check whether the $n^{th}$ SSB of the serving cell is turned on based on valid bitmap information of the serving cell. To this end, the controller 122 may check whether the $n^{th}$ SSB among the set number N of SSBs is turned on, based on the valid SSB bitmap information of the serving cell.

When the checking operation is completed (S350), the validity of the $n^{th}$ SSB may be determined based on the checking verification result (S354 or S358).

When the $n^{th}$ SSB is determined to be turned on, the controller 122 may determine that the $n^{th}$ SSB is valid (S354). On the other hand, when the $n^{th}$ SSB is determined to be turned off, the controller 122 may determine that the $n^{th}$ SSB is invalid (S358).

When the determination operation is completed (S354 or S358), a decision to store, or not store, the information about the $n^{th}$ SSB based on the determination result may be determined (S356 or S360).

When the $n^{th}$ SSB is determined as being valid, the controller 122 may store information about the $n^{th}$ SSB in the storage 124 (S356). On the other hand, when the $n^{th}$ SSB is determined as being invalid, the controller 122 may not store the information about the $n^{th}$ SSB in the storage 124 (S360).

Next, operation S362 may determine if n=N. If yes, the validity checking for the SSB of the serving cell may be completed and the flow returns to operation S400. Otherwise, n may be incremented by 1 in operation S363 and the flow returns to operation S350 to repeat the just-described operations for the next SSB of the serving cell. In this manner, the third example of operation S300 in FIG. 6 may be performed as illustrated in FIG. 9.

Referring to FIG. 10, the fourth example of operation S300 in FIG. 6 is illustrated in detail. The operations of FIG. 10 will be described under the assumption that the terminal 100 receives the RRC parameter through RRC signaling from a serving cell (e.g., the first cell 10), and receives a plurality of SSBs from a neighbor cell (e.g., 20 or 30), and sets the number of measurement target SSBs among the SSBs of neighbor cell(s) based on the RRC parameter.

Operation S300 of FIG. 10 may start with operation 365 of initializing each of variables "m" and "n" to a value of "1" or other value less than or equal to a set number N of SSBs for a neighbor cell. This may be followed by operation S370 of checking whether the $m^{th}$ SSB corresponding to the $n^{th}$ SSB of a neighbor cell is turned on based on the effective SSB bitmap information of a serving cell.

The controller 122 may check whether the $m^{th}$ SSB (m=n) of the serving cell corresponding to the $n^{th}$ SSB among the set number N of SSBs is turned on.

For example, as illustrated in FIG. 4, because the serving cell and the neighbor cell correspond to an 'intra-frequency handover case' in which the frequency domains overlap, the SSBs of the neighbor cell may respectively correspond to the SSBs of the serving cell (for example, the first SSB SSB1 of the serving cell corresponds to the first SSB SSB1 of the neighboring cell).

When the checking operation is completed (S370), a decision on whether to measure the RS-SINR of the $n^{th}$ SSB may be made based on the checking result, and the validity of the $n^{th}$ SSB may be determined based on the checking result and operations S372 through S378.

When the $m^{th}$ SSB (m=n) of the serving cell is determined to be turned on in operation S370, the controller 122 may determine that the $n^{th}$ SSB of a neighbor cell is valid without measuring the RS-SINR of the $n^{th}$ SSB of the neighbor cell (S374).

On the other hand, when the $m^{th}$ SSB (m=n) of the serving cell is determined to be turned off in operation 370, the signal processing unit 125 may measure the RS-SINR of the $n^{th}$ SSB of the neighbor cell (S372). This measurement operation of the signal processing unit 125 may be controlled by the controller 122, and the RS-SINR measurement operation may be performed by the demodulator 126 of the signal processing unit 125. A value of the RS-SINR of the SSB measured by the demodulator 126 may be stored in the storage 124.

When the RS-SINR of the $n^{th}$ SSB is measured (S372), the measured RS-SINR of the $n^{th}$ SSB may be compared with a preset reference value T (S373).

The controller 122 may compare the measured RS-SINR of the nth SSB by the signal processing unit 125 with the preset reference value T. For example, the controller 122 may compare the RS-SINR of the nth SSB directly provided from the signal processing unit 125 with the preset reference value T, or may read the RS-SINR of the nth SSB stored in the storage 124, and compare the obtained RS-SINR of the nth SSB with the preset reference value T.

The preset reference value T may be set in advance by a user/manufacturer based on a tolerance range of RSRP to be allowed, and may be stored in the storage 24. Accordingly, the controller 122 may read and use the preset reference value T stored in the storage 124 during the comparison operation S373.

When the comparison operation is completed (S373), the validity of the $n^{th}$ SSB may be determined based on the comparison result (S374 or S378).

When the RS-SINR of the nth SSB is greater than the preset reference value T, the controller 122 may determine that the nth SSB is valid (S374). On the other hand, when the RS-SINR of the $n^{th}$ SSB is less than or equal to the preset reference value T, the controller 122 may determine that the $n^{th}$ SSB is invalid (S378).

When the determination operation is completed (S374 or S378), a decision on whether to store, or not store, the information about the $n^{th}$ SSB based on the determination result may be made (S376 or S380).

When the $n^{th}$ SSB is determined as valid, the controller 122 may store information about the $n^{th}$ SSB in the storage 124 (S376). On the other hand, when the $n^{th}$ SSB is determined as invalid, the controller 122 may not store the information about the $n^{th}$ SSB in the storage 124 (S380).

Next, operation S382 may determine if n=N. If yes, the validity checking for the SSB of the neighbor cell may be completed and the flow returns to operation S400. Otherwise, both m and n may be incremented by 1 in operation S383 and the flow returns to operation S370 to repeat the just-described operations for the (m+1)st SSB of the serving cell and the (n+1)st SSB of the neighbor cell. In this manner, the fourth example of operation S300 in FIG. 6 may be performed as illustrated in FIG. 10.

Referring now to FIG. 11, the fifth example of operation S300 in FIG. 6 is illustrated in detail. Operation S300 of FIG. 11 may start with a variable initializing operation S384, which may be the same as operation S365 of FIG. 10. Next, in operation S385 the controller 122 may check whether the $m^{th}$ SSB of the serving cell corresponding to the $n^{th}$ SSB of the neighbor cell is turned on based on the valid SSB bitmap information of the serving cell.

When the checking operation S385 is completed, a decision as to whether the PBCH of the $n^{th}$ SSB is to be decoded may be made based on the checking result, and the validity of the $n^{th}$ SSB may be determined based on the checking result and operations S387 to S389.

When the $m^{th}$ SSB (m=n) of the serving cell is verified as being turned on, the controller 122 may determine that the $n^{th}$ SSB of a neighbor cell is valid without decoding the PBCH of the $n^{th}$ SSB of the neighbor cell (S390).

On the other hand, when the $m^{th}$ SSB (m=n) of the serving cell is verified as being turned off, the signal processing unit 125 may decode the PBCH of the $n^{th}$ SSB of the neighbor cell (S387).

The signal processing unit 125 may decode the PBCH of the $n^{th}$ SSB among the set number N of SSBs. This decoding operation of the signal processing unit 125 may be controlled by the controller 122, and the PBCH decoding operation may be performed by the channel decoder of the signal processing unit 125.

When decoding of the PBCH of the n-th SSB is completed (S387), decoding success or failure of the PBCH of the $n^{th}$ SSB may be checked (S389).

The controller 122 may check whether the decoding operation of the PBCH of the $n^{th}$ SSB performed by the signal processing unit 125 is successful. In other words, the controller 122 may receive the decoding result of the PBCH of the $n^{th}$ SSB from the signal processing unit 125, and may check whether the decoding is successful based on the received decoding result of the PBCH of the $n^{th}$ SSB.

When the checking operation is completed (S389), the validity of the $n^{th}$ SSB may be determined based on the checking result (S390 or S394).

When the decoding operation on the PBCH of the $n^{th}$ SSB is successful, the controller 122 may determine that the $n^{th}$ SSB is valid (S390). On the other hand, when the decoding operation on the PBCH of the $n^{th}$ SSB is unsuccessful, the controller 122 may determine that the $n^{th}$ SSB is invalid (S394).

When the determination operation is completed (S390 or S394), a decision on whether to store, or not to store, the information about the $n^{th}$ SSB based on the determination result may be determined (S392 or S396).

When the $n^{th}$ SSB is determined as being valid, the controller 122 may store information about the $n^{th}$ SSB in the storage 124 (S392). On the other hand, when the $n^{th}$ SSB is determined as being invalid, the controller 122 may not store the information about the $n^{th}$ SSB in the storage 124 (S396).

Next, operation S398 may determine if n=N. If yes, the validity checking for the SSB of the neighbor cell may be completed and the flow returns to operation S400. Otherwise, both m and n may be incremented by 1 in operation S399 and the flow returns to operation S385 to repeat the just-described operations for the next higher SSB of the serving cell and the (n+1)st SSB of the neighbor cell. In this manner, the fifth example of operation S300 in FIG. 6 may be performed as illustrated in FIG. 11.

Referring again to FIG. 6, when operation S300 is completed, the number of valid SSBs is checked, and the RSRP of a cell may be measured or the cell may be determined as invalid (S400).

The controller 122 may check the number of valid SSBs based on the information about SSBs stored in the storage 124, and may control the signal processing unit 125 to measure the RSRP of the cell or invalidate the cell based on the checking result.

For instance, as illustrated in FIG. 9, when operations S150 through S300 target the SSB of the serving cell, the result thereof may be concluded at operation S400 by measuring the RSRP of the serving cell. In other words, when the process proceeds from operation S412 (NO) of FIG. 12 to operation S420 of FIG. 12, the serving cell may not be invalidated. This is because at least one of the SSBs of the serving cell is always turned on (that is, at least one bit in the valid SSB bitmap of the serving cell is always turned on), and the serving cell may not be invalidated. For this reason, when operations S150 through S300 are performed for the SSB of the serving cell as a target, without performing operation S412 (that is, an operation of verifying the number of valid SSBs) in operation S400, operation S420 (that is, an operation of measuring the RSRP of the serving cell based on stored SSB information) may be performed.

On the other hand, as illustrated in FIGS. 7, 8, 10, and 11, when operations S150 through S300 target the SSB of the neighbor cell, the RSRP of the neighbor cell may be measured or the neighbor cell may be invalidated in operation 400.

However, for brevity, the following description of the cell in operation S400 will not specify a serving cell or a neighbor cell.

Referring to FIG. 12, an example of operation S400 in FIG. 6 is illustrated in detail. Operation S400 may start with operation S412 of checking the number of valid SSBs. When the number of valid SSBs is 0, a decision may be made to invalidate the cell (S414).

In this regard, when the controller 122 determines to invalidate the cell, the cell may be determined as an invalid cell (S422). On the other hand, when the controller 122 determines not to invalidate the cell, the controller 122 may re-determine that the SSB having the largest RS-SINR among the set number of SSBs is valid (S416).

For example, the controller 122 may be configured to invalidate cells when the number of valid SSBs is 0, by means of a setting set in advance by a user or a manufacturer.

When the RS-SINR of each SSB has been measured in operation S300 (the case of FIGS. 7 and 10), because the value of the RS-SINR of each SSB is stored in the storage 124, and the signal processing unit 125 may not need to re-measure the RS-SINRs of SSBs in operation S416. However, when the RS-SINR of each SSB has not been measured in operation S300 (the case of FIGS. 8, 9, and 11), the RS-SINR value of each SSB may not be stored in the storage 124, the signal processing unit 125 may re-measure the RS-SINRs of SSBs in operation S416.

When the SSB having the largest RS-SINR is determined as valid (S416), SSB information re-measured as valid may be stored (S418).

The controller 122 may store the SSB information re-determined as being valid in the storage 124.

When the SSB information is stored (S418), the RSRP of the cell may be measured based on the stored SSB information (S420).

The controller 122 may control the signal processing unit 125 to measure the RSRP of the cell based on the SSB information stored in the signal processing unit 125. To this end, the signal processing unit 125 may measure the RSRP of the cell in a manner defined in the RRC parameter. For instance, the RSRP measurement operation of the cell may be performed by the mobility measurement unit of the signal processing unit 125, and the RSRP measurement operation of the mobility measurement unit may be controlled by the controller 122.

On the other hand, when the number of valid SSBs is 1 or more, the RSRP of the cell may be measured based on the valid SSBs (S420).

The controller 122 may control the signal processing unit 125 to measure the RSRP of the cell based on the valid SSBs. In this regard, the signal processing unit 125 may measure the RSRP of the cell in a manner defined in the RRC parameter.

As described above, an operating method of a terminal (that is, a measuring method of RSRP of a cell) may be performed according to an embodiment of the inventive concept. Hereinafter, a wireless communication device implemented according to an embodiment of the inventive concept will be described with reference to FIG. 13.

Figure 13:
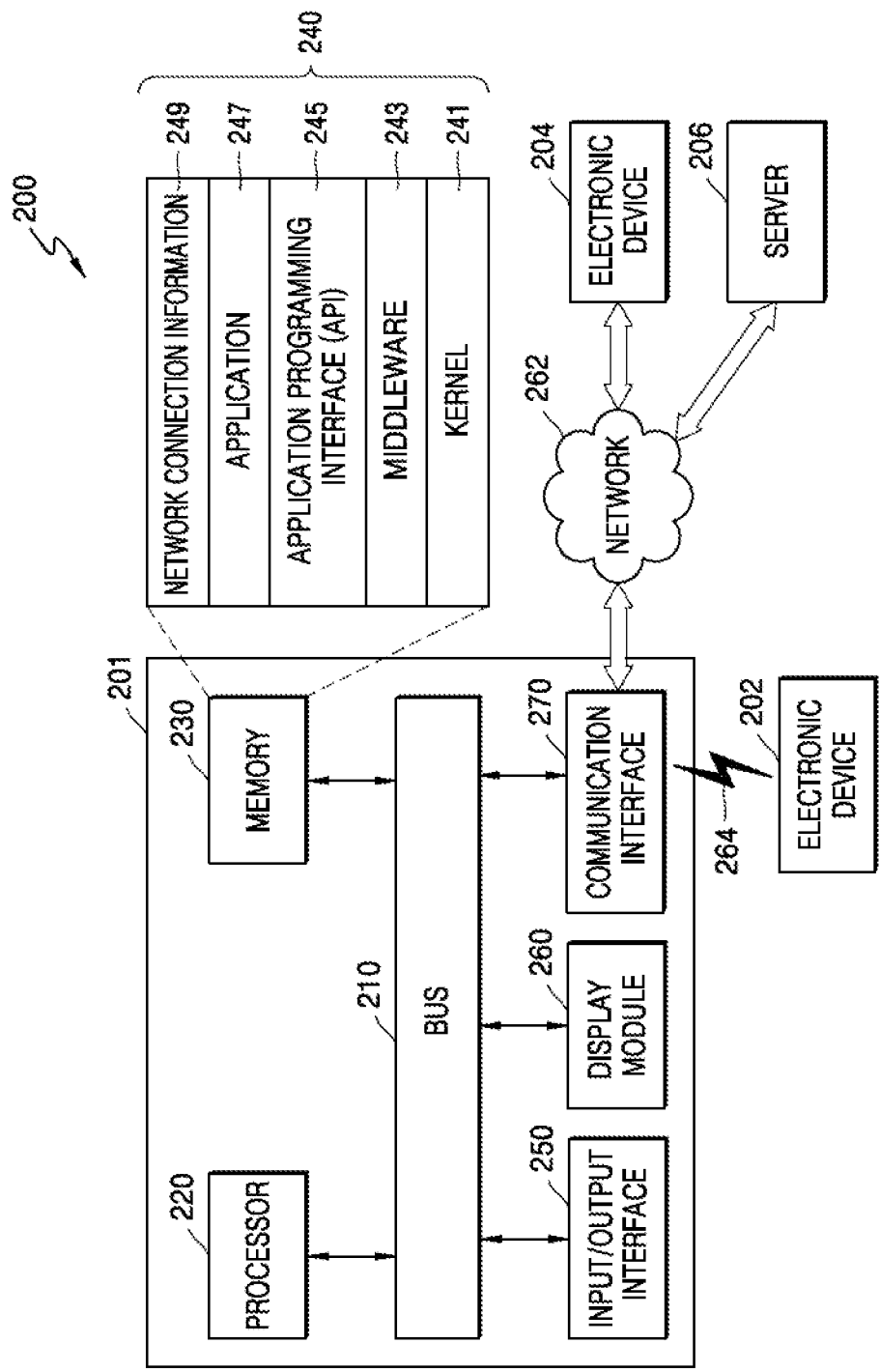
FIG. 13 is a block diagram of a wireless communication device according to an embodiment of the inventive concept.

FIG. 13 is a block diagram of a wireless communication device 201 implemented, according to an embodiment of the inventive concept.

For example, the wireless communication device 201 of FIG. 13 may be applied to a cell (for example, 10, 20, and 30 in FIG. 1, eNB, gNB, AP, or the like) or a terminal (for example, a terminal (for example, 100 in FIG. 1, STA, MS, UE, etc.), which is implemented according to embodiments of the inventive concept. Furthermore, in some embodiments of the present disclosure, the wireless communication device 201 in FIG. 13 may operate in a standalone (SA) mode or a non-standalone (NSA) mode.

Referring to FIG. 13, the wireless communication device 201 implemented in a network environment 200 is illustrated.

The wireless communication device 201 may include a bus 210, a processor 220, a memory 230, an input/output interface 250, a display module 260, and a communication interface 270. In other examples, the wireless communication device 201 may omit at least one of the above components or may additionally include at least one other component.

The bus 210 may connect components, 220 through 270, to each other. Accordingly, the exchange and transfer of signals (for example, control messages and/or data) between the components, 220 through 270, may be performed via the bus 210.

The processor 220 may include one or more of a central processing unit (CPU), an application processor (AP), and a communication processor (CP). In addition, the processor 220 may, for example, perform controlling of and/or computation or data processing related to communication of other components in the wireless communication device 201. The processor 220 may include a component having the functions of the controller 122 in FIG. 5.

The memory 230 may include a volatile memory and/or a nonvolatile memory. In addition, the memory 230 may, for example, store commands or instructions or data related to other components in the wireless communication device 201.

In addition, the memory 230 may store software and/or a program 240. The program 240 may include, for example, a kernel 241, middleware 243, an application programming interface (API) 245, an application program 247 (also referred to as an application, and network connection information 249.

For example, at least some of the kernel 241, the middleware 243, and the API 245 may be referred to as an operating system (OS). In addition, the memory 230 may include a component having the function of the storage 124 in FIG. 5.

The input/output interface 250 may, for example, transmit commands or data input from a user or other external device to other components of the wireless communication device 201. In addition, the input/output interface 250 may output commands or data received from other components of the wireless communication device 201 to a user or other external device.

The display module 260 may include, for example, a liquid crystal display (LCD), a light emitting diode (LED) display, an organic light emitting diode (OLED) display, or a micro electromechanical systems (MEMS) display, or an electronic paper display.

In addition, the display module 160 may display various contents (for example, texts, images, videos, icons, symbols, or the like) to the user. In addition, the display module 260 may include a touch screen, and may receive, for example, a touch, a gesture, proximity, or hovering input by using an electronic pen or a user's body part.

The communication interface 270 may establish communication between the wireless communication device 201 and an external device (for example, electronic devices 202 and 204 or a server 206). For example, the communication interface 270 may be connected to the network 262 via wireless communication or wired communication to communicate with an external device (for example, the electronic device 204 or the server 206). In addition, the communication interface 270 may communicate with an external device (for example, the electronic device 202) via wireless communication 264. In addition, the communication interface 270 may include a component having the functions of the FEM 105, the RFIC 110, and the signal processing unit 125 in FIG. 5.

The wireless communication 264 may have a cellular communication protocol, and may use, for example, at least one of 5G, LTE, LTE-A, CDMA, WCDMA, universal mobile telecommunications system (UMTS), WiBro, and GSM. And the wired communication may include, for example, at least one of universal serial bus (USB), high definition multimedia interface (HDMI), recommended standard 232 (RS-232), and plain old telephone service (POTS).

In addition, the network 262 may be a telecommunications network, and include, for example, at least one of a computer network (for example, LAN or wide area network (WAN)), Internet, and a telephone network.

On the other hand, each of the external electronic devices 202 and 204 may include a device of the same type as or a different type from the wireless communication device 201. In addition, the server 206 may include a group of one or more servers.

It is noted that all or some of the operations executed in the wireless communication device 201 may be executed in other external devices (for example, the electronic devices 202 and 204, or the server 206).

In addition, when the wireless communication device 201 is required to perform a certain function or service automatically or upon request, the wireless communication device 201 may perform the function or service by itself, or may request some function or service to the other external devices (for example, the electronic devices 202 and 204, or the server 206). In addition, the other external devices (for example, the electronic devices 202 and 204, or the server 206) may execute a requested function or service, and transmit the execution result to the wireless communication device 201. In this case, the wireless communication device 201 may perform the function or service by processing the received result as is or additionally.

For this mechanism, for example, cloud computing technology, distributed computing technology, or client-server computing technology may be applied to the wireless communication device 201.

As described above, in embodiments of the inventive concept, because the RSRP of a cell is measured through a validity checking operation of an SSB, RSRP measurement accuracy of the cell may be improved. Furthermore, handover performance/stability may be improved by improving the RSRP measurement accuracy of the cell, and modem performance of a terminal may be improved by improving the handover performance/stability.

While the inventive concept has been particularly shown and described with reference to embodiments thereof, it will be understood that various changes in form and details may be made therein without departing from the spirit and scope of the following claims and their equivalents.

What is claimed is:

1. A baseband circuit within a terminal in a wireless communication system, the baseband circuit comprising:
    a storage;
    a controller configured to write or read data to or from the storage; and
    a signal processor controlled by the controller;
    wherein,
    the baseband circuit receives a first signal from a radio frequency integrated circuit (RFIC) of the terminal, the first signal comprising a plurality of synchronization signal blocks (SSBs) generated in a neighbor cell among a plurality of cells of the wireless communication system, and receives a second signal comprising a radio resource control (RRC) parameter generated in a serving cell among the plurality of cells,
    the controller sets a number of measurement target SSBs among the plurality of SSBs based on the RRC parameter,
    the signal processor performs an operation of determining whether each respective SSB of the measurement target SSBs is valid via: (i) performing a first type of signal quality measurement in response to a corresponding serving cell SSB being turned off, and (ii) automatically determining that the respective SSB is valid in response to the corresponding serving cell SSB being turned on, and
    the controller stores valid SSB information in the storage based on a result of the operation, checks a number of valid SSBs based on the stored valid SSB information, and based on a result of the checking, controls the signal processor to either invalidate the neighbor cell, or to measure reference signal received power (RSRP) of the neighbor cell as a second type of signal quality measurement different from the first type of signal quality measurement.

2. The baseband circuit of claim 1, wherein the RRC parameter comprises valid SSB bitmap information of the serving cell.

3. The baseband circuit of claim 2, wherein the first type of signal quality measurement is reference signal (RS)-signal-to-interference-and-noise ratio (RS-SINR) measurement, and the controller is configured to:
    check whether an $m^{th}$ SSB of the serving cell, corresponding to an $n^{th}$ SSB among the set number of SSBs generated in the neighbor cell based on the valid SSB bitmap information of the serving cell, is turned on, wherein 1≤n≤N, n is a natural number of 1 or more, N is the set number, and m=n,
    determine whether to measure the RS-SINR of the $n^{th}$ SSB of the neighbor cell based on a result of the check as to whether the $n^{th}$ SSB is turned on,
    determine that the $n^{th}$ SSB is valid when the $n^{th}$ SSB is turned on,
    determine whether to store $n^{th}$ SSB information in the storage based on a determination result for the validity of the $n^{th}$ SSB,
    check whether n=N, and
    when n=N, terminate validity checking for SSBs of the neighbor cell.

4. The baseband circuit of claim 3, wherein, when the $m^{th}$ SSB of the serving cell is determined to be turned on, the controller determines that the $n^{th}$ SSB is valid without measuring the RS-SINR of the $n^{th}$ SSB.

5. The baseband circuit of claim 3, wherein, when the $m^{th}$ SSB of the serving cell is determined to be turned off, the controller controls the signal processor to measure the RS-SINR of the $n^{th}$ SSB, compares the measured RS-SINR of the $n^{th}$ SSB with a preset reference value, and determines a validity of the $n^{th}$ SSB based on the comparison of the measured RS-SINR of the $n^{th}$ SSB with the preset reference value.

6. The baseband circuit of claim 5, wherein, when the RS-SINR of the $n^{th}$ SSB is greater than the preset reference value, the controller determines that the $n^{th}$ SSB is valid, and
    when the RS-SINR of the $n^{th}$ SSB is less than or equal to the preset reference value, the controller determines that the $n^{th}$ SSB is invalid.

7. The baseband circuit of claim 3, wherein, when the $n^{th}$ SSB is determined as being valid, the controller stores the $n^{th}$ SSB information in the storage, and
    when the $n^{th}$ SSB is determined as being invalid, the controller does not store the $n^{th}$ SSB information in the storage.

8. The baseband circuit of claim 3, wherein,
when n<N, the controller starts validity checking for an $(n+1)^{th}$ SSB by controlling the signal processor.

* * * * *